United States Patent
Freeman et al.

(10) Patent No.: US 10,592,000 B2
(45) Date of Patent: Mar. 17, 2020

(54) GESTURE-BASED GUI FOR COMPUTING DEVICES

(71) Applicant: DAQRI, LLC, Los Angeles, CA (US)

(72) Inventors: Jonathan Trevor Freeman, Los Angeles, CA (US); Michael Kozlowski, Los Angeles, CA (US); Sterling Crispin, Los Angeles, CA (US); Ari Green, Los Angeles, CA (US)

(73) Assignee: DAQRI, LLC, Los Angeles, CA (US)

( * ) Notice: Subject to any disclaimer, the term of this patent is extended or adjusted under 35 U.S.C. 154(b) by 75 days.

(21) Appl. No.: 15/466,767

(22) Filed: Mar. 22, 2017

(65) Prior Publication Data
US 2018/0275762 A1    Sep. 27, 2018

(51) Int. Cl.
*G06F 3/01*    (2006.01)
*G06F 3/0482*    (2013.01)
*G06F 3/0346*    (2013.01)

(52) U.S. Cl.
CPC ............ *G06F 3/017* (2013.01); *G06F 3/0346* (2013.01); *G06F 3/0482* (2013.01)

(58) Field of Classification Search
CPC .......... G06F 3/013; G06F 3/017; G06F 3/048; G06F 3/0346
See application file for complete search history.

(56) References Cited

U.S. PATENT DOCUMENTS

| | | | | |
|---|---|---|---|---|
| 6,882,354 B1* | 4/2005 | Nielsen | .................... | G06F 3/013 715/784 |
| 2003/0107607 A1* | 6/2003 | Nguyen | .............. | G06F 3/04883 345/863 |
| 2006/0055669 A1* | 3/2006 | Das | ..................... | G06F 3/04883 345/156 |
| 2007/0143068 A1* | 6/2007 | Pasolini | ............... | G01C 22/006 702/160 |
| 2015/0177855 A1* | 6/2015 | Grenet | .................. | G06F 3/0383 345/158 |

(Continued)

OTHER PUBLICATIONS

Bailly, Gilles, Muhammad Tahir and Eric Lecolinet. ARemote: A Tangible Interface for Selecting TV Channels. 17th International Conference on Artificial Reality and Telexistence 2007. (Year: 2007).*

(Continued)

*Primary Examiner* — Jennifer N To
*Assistant Examiner* — Liang Y Li
(74) *Attorney, Agent, or Firm* — Schwegman Lundberg & Woessner, P.A.

(57) ABSTRACT

A computing device provides augmented reality images of an environment in which the computing device is used. The computing device is further configured to display a graphical user interface for interacting with the computing device. The graphical user interface may be displayed according to one or more configured graphical user interface layouts. The computing device further includes an inertial measurement unit, which provides input for interacting with one or more portions of the graphical user interface. As a user of the computing device moves the computing device, corresponding graphical changes are made to the displayed graphical user interface. In this way, by moving the computing device, the user is able to interact with, and provide input to, the computing device.

18 Claims, 15 Drawing Sheets

(56) References Cited

U.S. PATENT DOCUMENTS

2018/0096507 A1* 4/2018 Valdivia ................ G06T 11/60

OTHER PUBLICATIONS

"A Guide to using IMU( Accelerometer and Gyroscope Devices) in Embedded Applications.", [Online]. Retrieved from the Internet: <URL:http://www.starlino.com/imu_guide.html>, (Dec. 29, 2009), 88 pgs.

* cited by examiner

GESTURE-BASED GUI FOR COMPUTING DEVICES

TECHNICAL FIELD

The subject matter disclosed herein generally relates to gesture-based processing for computing devices and, in particular, to interpreting gestures and/or movements by a user as input for a graphical user interface displayed on a computing device.

BACKGROUND

Augmented reality (AR) is a live direct or indirect view of a physical, real-world environment whose elements are augmented (or supplemented) by computer-generated sensory input such as sound, video, graphics or Global Positioning System (GPS) data. Device-generated (e.g., artificial) information about the environment and its objects can be overlaid on the real world.

Typically, a user uses a conventional computing device to view the augmented reality. The conventional computing device may be equipped with an input device, such as a software-based or hardware-based keyboard, for providing input to, and controlling, the computing device.

BRIEF DESCRIPTION OF THE DRAWINGS

Some embodiments are illustrated by way of example and not limited to the figures of the accompanying drawings.

FIGS. 6A-6I illustrate exemplary interactions 600 with another exemplary graphical user interface implemented by a computing device according to example embodiments of the present invention;

Figure 1:
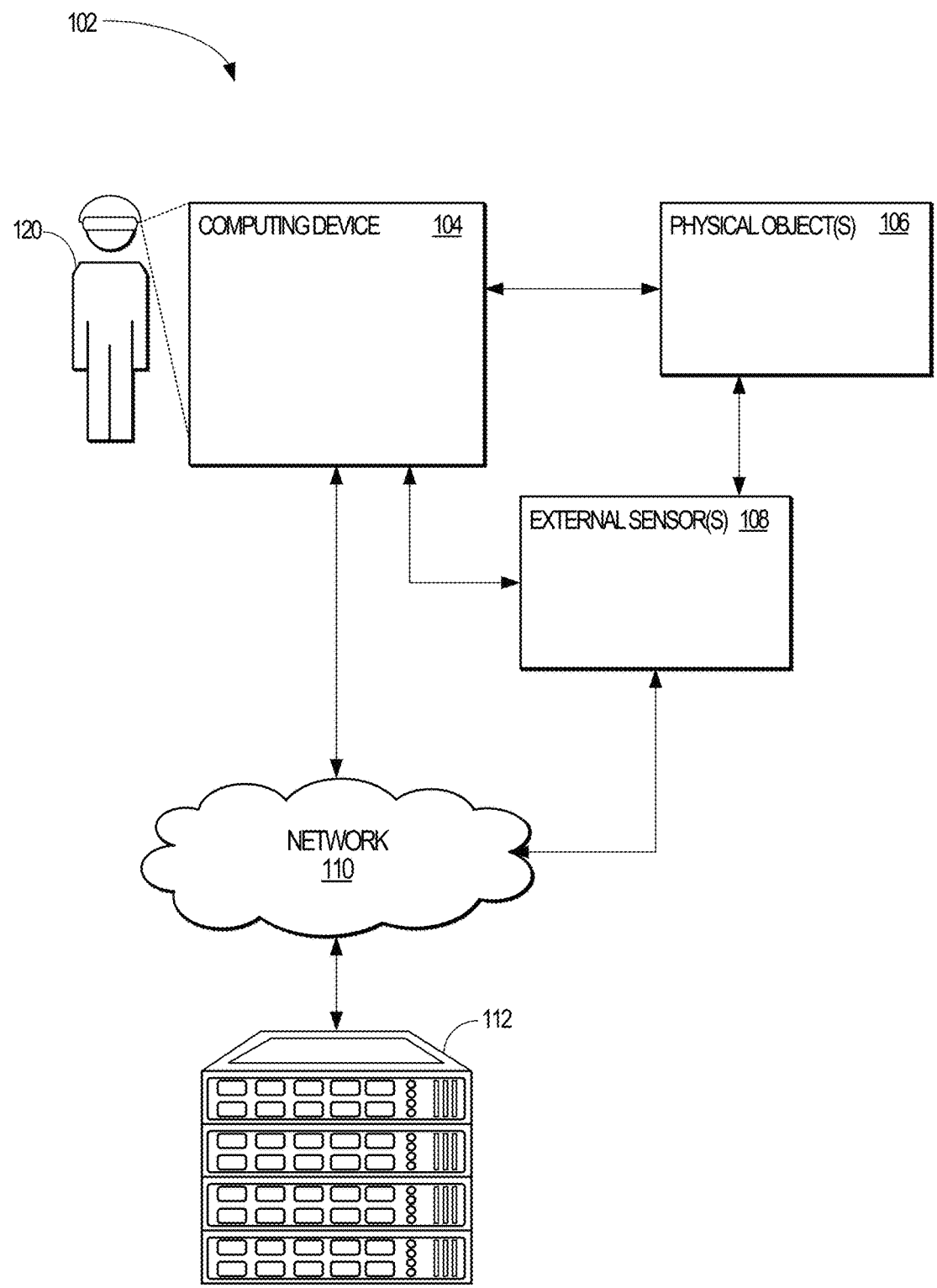
FIG. 1 is a block diagram illustrating an example of a network environment suitable for a computing device, according to an example embodiment of the present invention.

Unless otherwise indicated illustrations in the figures are not necessarily drawn to scale.

DETAILED DESCRIPTION

The present disclosure describes many embodiments of a computing device that displays a graphical user interface, which may be controlled via gestures and/or movements by a user of the computing device. In some embodiments, the computing device may be worn on a body part of the user. In some other embodiments, the computing device may be carried by the user. In many embodiments, the computing device reacts in response to movements by the user. In many embodiments, the computing device is configured to display a graphical user interface, such as, and without limitation, a displayed menu, a displayed reticle, and/or other displayed interactive image objects. In many embodiments the menu has one or more items representing applications that are accessible via the computing device. The graphical user interface may further include a displayed reticle, which reacts to detected movements of a computing device. The reticle may be implemented as a position indicator providing feedback to the user to indicate to the user how he or she should move the computing device so as to select and/or activate an application accessible via the graphical user interface. In some embodiments, the reticle may provide feedback to the user to indicate to the user how he or she should move a body part controlling the computing device so as to select and/or activate an application accessible via the graphical user interface.

The displayed graphical user interface may further include one or more displayed menu items that, in response to gesture-based input from a user, change in their appearance. The menu items may transition between one or more states, where a first state may be in response to the reticle located at a position where the reticle does not intersect with a menu item and a second state may be in response to the reticle located at a position where the reticle intersects with one or more menu items. Further still, the menu items may be defined by one or more edges, which, in response to gesture-based input from the user, change in shape, intensity, and/or color. The changes in the edges of the displayed menu items further provide additional visual feedback to the user to indicate whether the user has successful activated an application associated with a corresponding menu item.

Accordingly, in one embodiment, this disclosure provides for a computing device having a display that displays a graphical user interface for interacting with the computing device, where the computing device includes a machine-readable memory storing computer-executable instructions, and at least one hardware processor in communication with the machine-readable memory that, when the computer-executable instructions are executed, configures the computing device to perform a plurality of operations. The plurality of operations include displaying, on a display in communication with the at least one hardware processor, a graphical user interface, the graphical user interface having at least one actuatable portion, wherein the at least one actuatable portion is associated with an application executable by the computing device, and acquiring, by at least one inertial measurement unit, a plurality of measurements indicating user movement of the computing device. The plurality of operations also include converting the plurality of measurements to obtain a plurality of vectors, wherein at least one vector of the plurality of vectors is associated with at least three axes of movement, determining a command to perform with the displayed graphical user interface based on the plurality of vectors, and performing the determined command with the displayed graphical user interface.

In another embodiment of the computing device, the plurality of operations further comprise comparing one or more values of the plurality of vectors with a plurality of corresponding thresholds, wherein at least one of the plurality of thresholds is associated with the command to perform, and the determining of the command to perform is further based on the comparison.

In a further embodiment of the computing device, the at least one actuatable portion is associated with a plurality of activity states, and the command to perform causes the actuatable portion to change from a first activity state to a second activity state.

In yet another embodiment of the computing device, the change from the first activity state to the second activity state causes a corresponding change in at least one actuatable portion attribute associated with the at least one actuatable portion.

In yet a further embodiment of the computing device, the plurality of operations further comprise displaying a position indicator responsive to the at least one vector, the command moving the position indicator to a predetermined area of the at least one actuatable portion, and executing at least one application associated with the at least one actuatable portion based on the movement of the position indicator to the predetermined area.

In another embodiment of the computing device, the at least one actuatable portion comprises a plurality of edges, at least one edge being associated with the execution of the at least one application, and\ the predetermined area comprises the at least one edge.

In a further embodiment of the computing device, the at least one actuatable portion comprises at least one edge, and the determined command causes a change in an appearance of the actuatable portion based on the plurality of vectors and the at least one edge.

This disclosure also describes a method for displaying a graphical user interface on a display of a computing device, where the method includes displaying, on a display in communication with the at least one hardware processor, a graphical user interface, the graphical user interface having at least one actuatable portion, wherein the at least one actuatable portion is associated with an application executable by the computing device, acquiring, by at least one inertial measurement unit, a plurality of measurements indicating user movement of the computing device, converting, by the at least one hardware processor, the plurality of measurements to obtain a plurality of vectors, wherein at least one vector of the plurality of vectors is associated with at least three axes of movement, determining, by the at least one hardware processor, a command to perform with the displayed graphical user interface based on the plurality of vectors, and performing, by the at least one hardware processor, the determined command with the displayed graphical user interface.

In another embodiment of the method, the method further comprises: comparing, by the at least one hardware processor, one or more values of the plurality of vectors with a plurality of corresponding thresholds, at least one of the thresholds selected from the plurality of thresholds associated with the command to perform, and the determining of the command to perform is further based on the comparison.

In a further embodiment of the method, the at least one actuatable portion is associated with a plurality of activity states, and the command to perform causes the actuatable portion to change from a first activity state to a second activity state.

In yet another embodiment of the method, the change from the first activity state to the second activity state causes a corresponding change in at least one actuatable portion attribute associated with the at least one actuatable portion.

In yet a further embodiment of the method, the method further comprises displaying, by the at least one hardware processor, a position indicator responsive to the at least one vector; and the command comprises moving, by the at least one hardware processor, the position indicator to a predetermined area of the at least one actuatable portion, and executing, by the at least one processor, at least one application associated with the at least one actuatable portion based on the movement of the position indicator to the predetermined area.

In another embodiment of the method, the at least one actuatable portion comprises a plurality of edges, at least one edge being associated with the execution of the at least one application, and the predetermined area comprises the at least one edge.

In a further embodiment of the method, the at least one actuatable portion comprises at least one edge, and the determined command causes a change in an appearance of the actuatable portion based on the plurality of vectors and the at least one edge.

This disclosure also provides for a computer-readable medium having computer-executable instructions stored thereon that, when executed by one or more hardware processors, cause a computing device to perform a plurality of operations. The plurality of operations include displaying, on a display in communication with the at least one hardware processor, a graphical user interface, the graphical user interface having at least one actuatable portion, wherein the at least one actuatable portion is associated with an application executable by the computing device, and acquiring, by at least one inertial measurement unit, a plurality of measurements indicating user movement of the computing device. The plurality of operations also include converting the plurality of measurements to obtain a plurality of vectors, wherein at least one vector of the plurality of vectors is associated with at least three axes of movement, determining a command to perform with the displayed graphical user interface based on the plurality of vectors, and performing the determined command with the displayed graphical user interface.

In another embodiment of the computer-readable medium, the plurality of operations further comprise comparing one or more values of the plurality of vectors with a plurality of corresponding thresholds, at least one of the thresholds selected from the plurality of thresholds associated with the command to perform, and the determining of the command to perform is further based on the comparison.

In a further embodiment of the computer-readable medium, the at least one actuatable portion is associated with a plurality of activity states, and the command to perform causes the actuatable portion to change from a first activity state to a second activity state, wherein the change from the first activity state to the second activity state causes a corresponding change in at least one actuatable portion attribute associated with the at least one actuatable portion.

In yet another embodiment of the computer-readable medium, the plurality of operations further comprise displaying a position indicator responsive to the at least one vector; and the command comprises moving the position indicator to a predetermined area of the at least one actuatable portion, and executing at least one application associated with the at least one actuatable portion based on the movement of the position indicator to the predetermined area.

In yet a further embodiment of computer-readable medium, the at least one actuatable portion comprises a plurality of edges, at least one edge being associated with the execution of the at least one application, and the predetermined area comprises the at least one edge.

In another embodiment of the computer-readable medium, the at least one actuatable portion comprises at least one edge, and the determined command causes a change in an appearance of the actuatable portion based on the plurality of vectors and the at least one edge.

FIG. 1 is a block diagram illustrating an example of a network environment 102 suitable for a computing device 104, according to an example embodiment. The network environment 102 includes the computing device 104 and a server 112 communicatively coupled to each other via a network 110. The computing device 104 and the server 112 may each be implemented in a computer system, in whole or in part, as described below with respect to FIG. 11.

The server 112 may be part of a network-based system. For example, the network-based system may be or include a cloud-based server system that provides additional information, such as three-dimensional (3D) models or other virtual objects, to the computing device 104.

The computing device 104 may be implemented in various form factors. In many embodiments, the computing device 104 may be a mobile device, worn or held by one or more users, a sampling denoted here as user 120. The one or more users are not part of the network environment 102, but are associated with corresponding computing devices. For example, in some embodiments the computing device 104 may be a wearable computing device with a display, such as a head-mounted computing device such as, and without limitation, a helmet, or glasses, with a display device and a camera by which a user may view objects (e.g., physical object(s) 106) through the display device, such as one or more lenses, affixed to the wearable computing device. In another embodiment, the computing device 104 is implemented as a lens frame, where the display device is implemented as one or more lenses affixed thereto. The display device and camera may be disposed on separate devices but may be communicatively connected. In some embodiments, the computing device 104 may also be hand held or may be temporarily mounted on a head of the user 120. In one embodiment, the computing device may be implemented as a mobile device such as, and without limitation, a mobile phone or tablet, therein the display device may be a screen that displays what is captured with a camera of the computing device. In another example, the display of the computing device 104 may be at least transparent, such as lenses of computing glasses. In another embodiment, the display is non-transparent and wearable by the user 120 to cover the field of view of the user 120. In many embodiments a multiplicity of computing devices may be separate and distinct devices of different types (e.g. a head mounted display and a mobile phone), wherein components and software modules of the separate and distinct devices provide similar capabilities. In yet another embodiment, the computing device 104 is implemented as a watch (e.g., a housing mounted or affixed to a wristband), and the display device is implemented as a display (e.g., liquid crystal display (LCD) or light emitting diode (LED) display) affixed to the computing device 104.

In the present embodiment, a user 120 may wear the computing device 104 and view a real world physical environment including one or more physical object(s) 106 in the real world physical environment. The user 120 may be a human user (e.g., a human being), a machine user (e.g., a computer configured by a software program to interact with the computing device 104), or any suitable combination thereof (e.g., a human assisted by a machine or a machine supervised by a human). In another example, the display may be transparent or semi-transparent, such as lenses of computing glasses or a visor or a face shield of a helmet.

The user 120 may be a user of an augmented reality (AR) application executable by the computing device 104 and/or the server 112. The AR application may provide the user 120 with an AR experience triggered by one or more identified objects (e.g., physical object(s) 106) in the physical environment. For example, the physical object(s) 106 may include identifiable objects such as a two-dimensional (2D) physical object (e.g., a picture), a 3D physical object (e.g., a factory machine), a location (e.g., at the bottom floor of a factory), or any references (e.g., perceived corners of walls or furniture) in the real-world physical environment. The AR application may include computer vision recognition to determine various features within the physical environment such as corners, objects, lines, letters, and other such features or combination of features.

In one embodiment, the objects in an image captured by the computing device 104 are tracked and locally recognized using a local context recognition dataset or any other previously stored dataset of the AR application. The local context recognition dataset may include a library of virtual objects associated with real-world physical objects or references. In one embodiment, the computing device 104 identifies feature points in an image of the physical object 106. The computing device 104 may also identify tracking data related to the physical object 106 (e.g., GPS location of the computing device 104, orientation, or distance to the physical object(s) 106). If the captured image is not recognized locally by the computing device 104, the computing device 104 can download additional information (e.g., 3D model or other augmented data) corresponding to the captured image, from a database of the server 112 over the network 110.

In another example embodiment, the physical object(s) 106 in the image is tracked and recognized remotely by the server 112 using a remote context recognition dataset or any other previously stored dataset of an AR application in the server 112. The remote context recognition dataset may include a library of virtual objects or augmented information associated with real-world physical objects or references.

The network environment 102 also includes one or more external sensors 108 that interact with the computing device 104 and/or the server 112. The external sensors 108 may be associated with, coupled to, or related to the physical object(s) 106 to measure a location, status, and characteristics of the physical object(s) 106. Examples of measured readings may include but are not limited to weight, pressure, temperature, velocity, direction, position, intrinsic and extrinsic properties, acceleration, and dimensions. For example, external sensors 108 may be disposed throughout a factory floor to measure movement, pressure, orientation, and temperature. The external sensor(s) 108 can also be used to measure a location, status, and characteristics of the computing device 104 and the user 120. The server 112 can compute readings from data generated by the external sensor(s) 108. The server 112 can generate virtual indicators such as vectors or colors based on data from external sensor(s) 108. Virtual indicators are then overlaid on top of a live image or a view of the physical object(s) 106 (e.g., displayed on the display device 114) in a line of sight of the user 120 to show data related to the physical object(s) 106. For example, the virtual indicators may include arrows with shapes and colors that change based on real-time data. Additionally and/or alternatively, the virtual indicators are rendered at the server 112 and streamed to the computing device 104.

The external sensor(s) 108 may include one or more sensors used to track various characteristics of the computing device 104 including, but not limited to, the location, movement, and orientation of the computing device 104 externally without having to rely on sensors internal to the computing device 104. The external sensor(s) 108 may include optical sensors (e.g., a depth-enabled 3D camera), wireless sensors (e.g., Bluetooth, Wi-Fi), Global Positioning System (GPS) sensors, and audio sensors to determine the location of the user 120 operating the computing device 104, distance of the user 120 to the external sensor(s) 108 (e.g., sensors placed in corners of a venue or a room), the orientation of the computing device 104 to track what the user 120 is looking at (e.g., direction at which a designated portion of the computing device 104 is pointed, e.g., the front portion of the computing device 104 is pointed towards a player on a tennis court).

Furthermore, data from the external sensor(s) 108 and internal sensors (not shown) in the computing device 104 may be used for analytics data processing at the server 112 (or another server) for analysis on usage and how the user 120 is interacting with the physical object(s) 106 in the physical environment. Live data from other servers may also be used in the analytics data processing. For example, the analytics data may track at what locations (e.g., points or features) on the physical object(s) 106 or virtual object(s) (not shown) the user 120 has looked, how long the user 120 has looked at each location on the physical object(s) 106 or virtual object(s), how the user 120 used the computing device 104 when looking at the physical object(s) 106 or virtual object(s), which features of the virtual object(s) the user 120 interacted with (e.g., such as whether the user 120 engaged with the virtual object), and any suitable combination thereof. To enhance the interactivity with the physical object(s) 106 and/or virtual objects, the computing device 104 receives a visualization content dataset related to the analytics data. The computing device 104, via the display device 114, then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that facilitates communication between or among machines (e.g., server 110), databases, and devices (e.g., the computing device 104 and the external sensor(s) 108). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
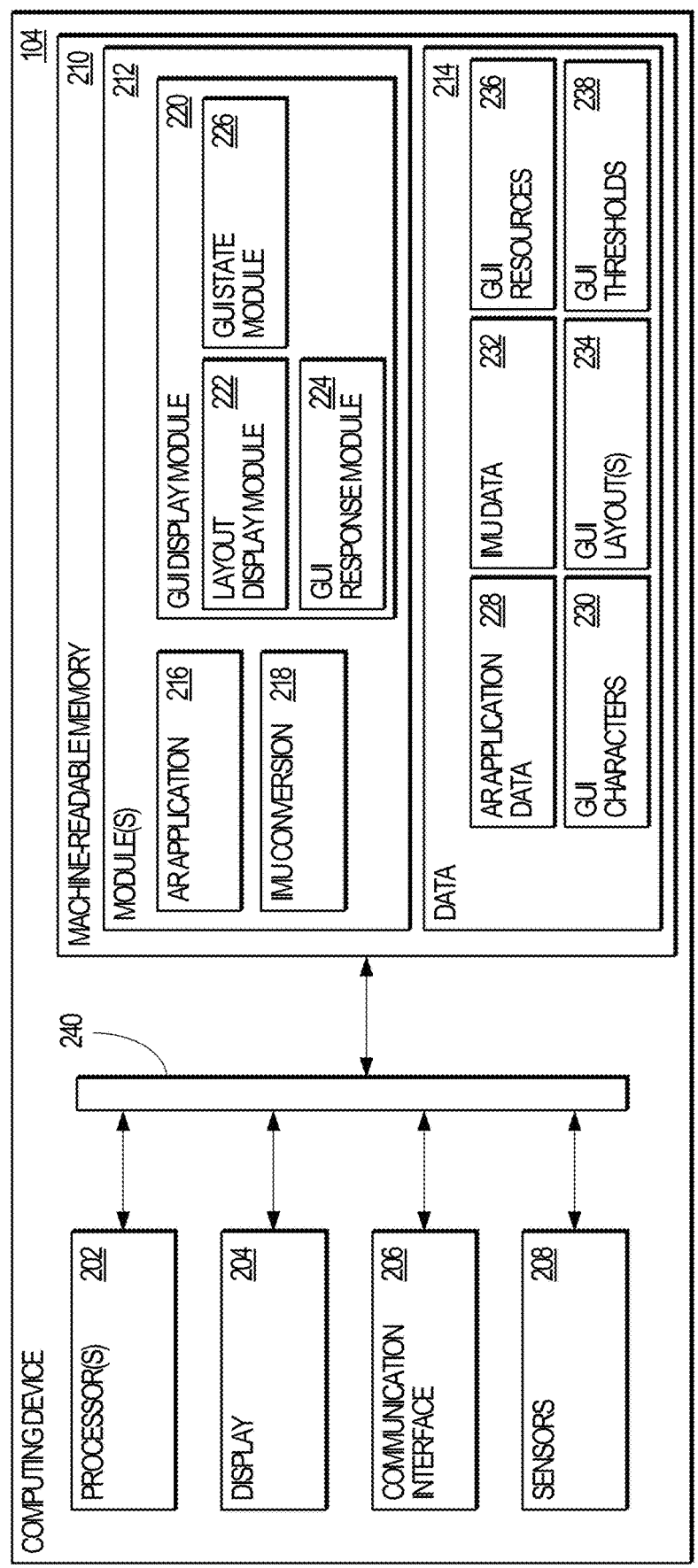
FIG. 2 illustrates a block diagram of an exemplary computing device according to an example embodiment of the present invention.

FIG. 2 illustrates a block diagram of an exemplary computing device according to an example embodiment of the present invention. The computing device 104 includes various different types of hardware components. In one embodiment, the computing device includes one or more processor(s) 202, a display 204, a communication interface 206, and one or more sensors 208. The computing device 104 also includes a machine-readable memory 210. The various components 202-210 communicate via a communication bus 240.

The one or more processors 202 may be any type of commercially available processor, such as processors available from the Intel Corporation, Advanced Micro Devices, Qualcomm, Texas Instruments, or other such processors. Further still, the one or more processors 202 may include one or more special-purpose processors, such as a Field-Programmable Gate Array (FPGA) or an Application Specific Integrated Circuit (ASIC). The one or more processors 202 may also include programmable logic or circuitry that is temporarily configured by software to perform certain operations. Thus, once configured by such software, the one or more processors 202 become specific machines (or specific components of a machine) uniquely tailored to perform the configured functions and are no longer general-purpose processors.

The display 204 may include a display surface or lens configured to display AR content (e.g., images, video) generated by the one or more processor(s) 202. In one embodiment, the display 204 is made of a transparent material (e.g., glass, plastic, acrylic, etc.) so that the user 120 can see through the display 204. In another embodiment, the display 204 is made of several layers of a transparent material, which creates a diffraction grating within the display 204 such that images displayed on the display 204 appear holographic. The processor(s) 202 are configured to display a graphical user interface on the display 204 so that the user 120 can interact with the computing device 104.

The communication interface 206 may be configured to facilitate communications between the computing device 104, the user 120, the external sensor(s) 108, and the server 112. The communication interface 206 may include one or more wired communication interfaces (e.g., Universal Serial Bus (USB), an I²C bus, an RS-232 interface, an RS-485 interface, etc.), one or more wireless transceivers, such as a Bluetooth® transceiver, a Near Field Communication (NFC) transceiver, an 802.11x transceiver, a 3G (e.g., a GSM and/or CDMA) transceiver, a 4G (e.g., LTE and/or Mobile WiMAX) transceiver, or combinations of wired and wireless interfaces and transceivers. In one embodiment, the communication interface 206 interacts with the sensors 208 to provide input to the computing device 104. In this embodiment, the user 120 may engage in gestures, eye movements, speech, or other physical activities that the computing device 104 interprets as input (e.g., via the AR application 214).

To detect the movements of the user 120, the computing device 104, and/or other objects in the environment, the computing device 104 includes one or more sensors 208. The sensors 208 may generate internal tracking data of the computing device 104 to determine a position and/or an orientation of the computing device 104. In addition, the sensors 208 cooperatively operate to assist the computing device 104 in identifying objects and obtaining thermal imagery for objects within the environment where the computing device 104 is located.

The position and the orientation of the computing device 104 may be used to identify real-world objects in a field of view of the computing device 104. For example, a virtual object may be rendered and displayed in the display 204 when the sensors 208 indicate that the computing device 104 is oriented towards a real-world object (e.g., when the user 120 looks at one or more physical object(s) 106) or in a particular direction (e.g., when the user 120 tilts his head to watch his wrist).

The computing device 104 may display a virtual object in response to a determined geographic location of the computing device 104. For example, a set of virtual objects may be accessible when the user 120 of the computing device 104 is located in a particular building. In another example, virtual objects, including sensitive material, may be accessible when the user 120 of the computing device 104 is located within a predefined area associated with the sensitive material and the user 120 is authenticated. Different levels of content of the virtual objects may be accessible based on a credential level of the user 120. For example, a user who is an executive of a company may have access to more information or content in the virtual objects than a manager at the same company. The sensors 208 may be used to authenticate the user 120 prior to providing the user 120 with access to the sensitive material (e.g., information displayed in as a virtual object such as a virtual dialog box in a transparent display). Authentication may be achieved via a variety of methods such as providing a password or an authentication token or using sensors 208 to determine biometric data unique to the user 120.

The computing device 104 is further configured to display a gesture-based graphical user interface that the user may use to interact with the computing device 104. Accordingly, in one embodiment, the computing device 104 is configured with a GUI display module 220 that displays a graphical user interface menu via the display 204. The GUI display module 220 may further process input via movements by the user 120 and detected by an IMU of the sensors 208. As discussed below, the GUI display module 220 may further include various sub- or internal modules 222-226 to facilitate the display of a multiplicity of interactive graphical interfaces and the interpretation of input as provided by the user 120.

Figure 3:
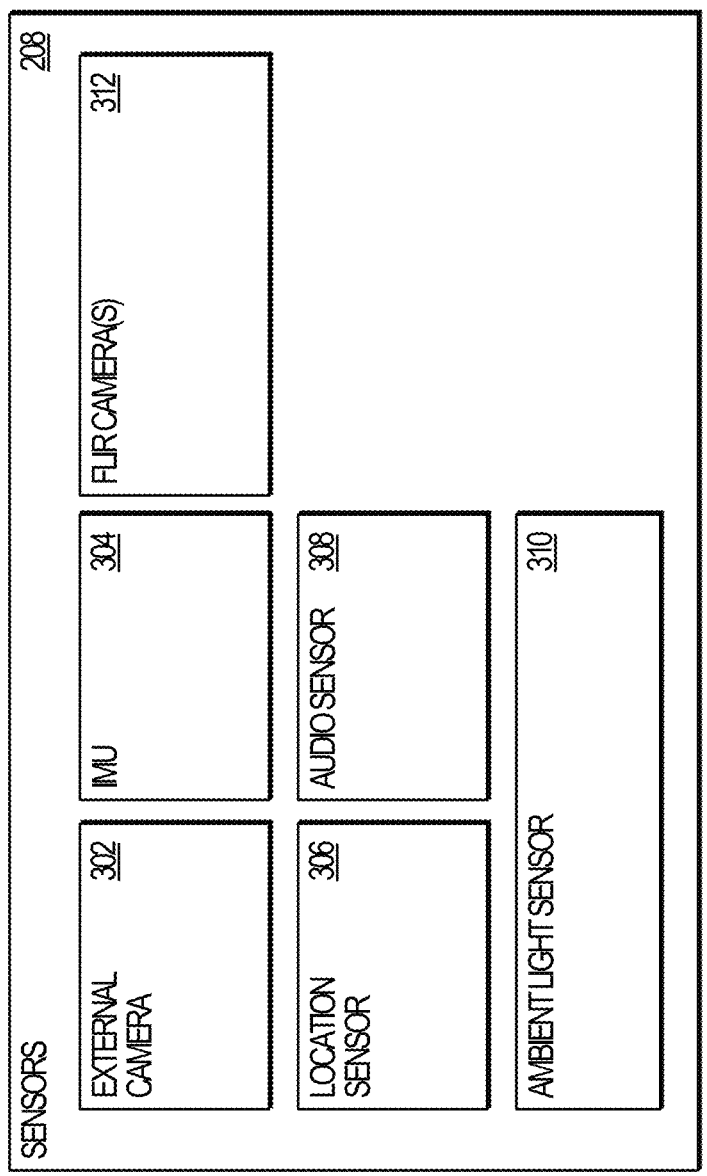
FIG. 3 is a block diagram illustrating different types of sensors used by a computing device according to an example embodiment of the present invention.

Now referring to FIG. 3, with reference to FIG. 2, FIG. 3 is a block diagram illustrating different types of sensors 208 used by a computing device according to an example embodiment of the present invention. For example, the sensors 208 may include an external camera 302, an inertial measurement unit (IMU) 304, a location sensor 306, an audio sensor 308, an ambient light sensor 310, and one or more forward looking infrared (FLIR) camera(s) 312. One of ordinary skill in the art will appreciate that the sensors illustrated in FIG. 3 are examples, and that different types and/or combinations of sensors may be employed in the computing device 104.

The external camera 302 includes an optical sensor(s) (e.g., camera) configured to capture images across various spectrums. For example, the external camera 302 may include an infrared camera and/or a full-spectrum camera. The external camera 302 may include a rear-facing camera(s) and a front-facing camera(s) disposed in the computing device 104. The front-facing camera(s) may be used to capture a front field of view of the computing device 104 while the rear-facing camera(s) may be used to capture a rear field of view of the computing device 104. The pictures captured with the front- and rear-facing cameras may be combined to recreate a 360-degree view of the physical environment around the computing device 104.

The IMU 304 may include a gyroscope and an inertial motion sensor to determine an orientation and/or movement of the computing device 104. For example, the IMU 304 may measure the velocity, orientation, and gravitational forces on the computing device 104. The IMU 304 may also measure acceleration using an accelerometer and changes in angular rotation using a gyroscope The IMU 304 may be implemented using a digital and/or analog accelerometer, where the digital accelerometer communicates information using a serial protocol such as I²C, Serial Peripheral Interface (SPI), or Universal Synchronous/Asynchronous Receiver/Transmitter (USART). An analog accelerator may output a voltage level within a predefined range that can be converted to a digital value using an analog-to-digital converter (ADC), as is known to one of ordinary skill in the art.

In one embodiment, and as discussed further below, the computing device 104 may be further configured with an IMU conversion module 218 that converts the measurements and/or readings obtained by the IMU 304 into values interpretable by the GUI display module 220. Thus, the outputs generated by the IMU 304 are usable as inputs to the GUI display module 220, which informs the GUI display module 220 as to which interactive graphical interface items the user 120 has selected while interacting with a displayed graphical user interface displayed by the GUI display module 220. In one embodiment, the measurements output by the IMU 304 include six different values, which indicate acceleration and orientation in three-dimensions or, more particularly, acceleration and orientation in one of three axes, such as the X-axis, Y-axis, and Z-axis. As one of ordinary skill in the art would understand, the output by the IMU 304 may be raw data, such as a voltage or a numerical value, which the IMU conversion module 218 then converts to one or more interpretable values for use by the GUI display module 220.

The location sensor 306 may determine a geolocation of the computing device 104 using a variety of techniques such as near field communication (NFC), the Global Positioning System (GPS), Bluetooth®, Wi-Fi®, and other such wireless technologies or combination of wireless technologies. For example, the location sensor 306 may generate geographic coordinates and/or an elevation of the computing device 104.

The audio sensor 308 may include one or more sensors configured to detect sound, such as a dynamic microphone, condenser microphone, ribbon microphone, carbon microphone, and other such sound sensors or combinations thereof. For example, the microphone may be used to record a voice command from the user (e.g., user 120) of the computing device 104. In other examples, the microphone may be used to measure an ambient noise (e.g., measure intensity of the background noise, identify specific type of noises such as explosions or gunshot noises).

The ambient light sensor 310 is configured to determine an ambient light intensity around the computing device 104. For example, the ambient light sensor 314 measures the ambient light in a room in which the computing device 104 is located. Examples of the ambient light sensor 310 include, but are not limited to, the ambient light sensors available from ams AG, located in Oberpremstatten, Austria.

The one or more FLIR camera(s) 312 are configured to capture and/or obtain thermal imagery of objects being viewed by the computing device 104 (e.g., by the external camera 302). One of ordinary skill in the art will appreciate that the FLIR camera(s) 312 illustrated in FIG. 3 and described below are examples, and that different types and/or combinations of infrared imaging devices may be employed in the computing device 104.

The FLIR camera(s) 312 may be affixed to different parts and/or surfaces of the computing device 104 depending upon its implementation. For example, where the computing device 104 is implemented as a head-mounted device, one or more of the FLIR camera(s) 312 may be affixed or mounted in a forward-looking or rearward-looking position on an exterior or interior surface of the computing device 104. As another example, where the computing device 104 is implemented as a wrist-mounted device (e.g., a watch), one or more of the FLIR camera(s) 312 may be affixed or disposed on a surface perpendicular to a surface having the display 204. In either examples, the one or more FLIR camera(s) 312 are arranged or disposed within the computing device 104 such that the FLIR camera(s) 312 obtain thermal imagery within the environment of the computing device 104.

Referring back to FIG. 2, the machine-readable memory 210 includes various modules 212 and data 214 for implementing the features of the computing device 104. The machine-readable memory 210 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 212 and the data 214. Accordingly, the machine-readable memory 210 may be implemented as a single storage apparatus or device, or, alternatively and/or additionally, as "cloud-based" storage systems or storage networks that include multiple storage apparatus or devices. As shown in FIG. 2, the machine-readable memory 210 excludes signals per se.

In one embodiment, the modules 212 are written in a computer-programming and/or scripting language. Examples of such languages include, but are not limited to, C, C++, C#, Java, JavaScript, Perl, Python, Ruby, or any other computer programming and/or scripting language now known or later developed.

The modules 212 include one or more modules 216-226 that implement features of the computing device 104. In one embodiment, the modules 212 include an AR application 216, the IMU conversion module 218, and the GUI display module 220. The data 214 includes one or more different sets of data 228-238 used by, or in support of, the modules 212. In one embodiment, the data 214 includes AR application data 228, GUI characters 230, IMU data 232, one or more GUI layout(s) 234, various GUI resources 236, and one or GUI thresholds 238. The integration and use of the various forms of data 214 is discussed below with reference to the modules 212.

The AR application 216 is configured to provide the user 120 with an AR experience triggered by one or more of the physical object(s) 106 in the user's 120 environment and/or a predetermined location detected be the computing device 104. Accordingly, the machine-readable memory 210 also stores AR application data 228 which provides the resources (e.g., sounds, images, text, and other such audiovisual content) used by the AR application 216. In response to detecting and/or identifying physical object(s) 106 and/or locations in the user's 120 environment, the AR application 216 generates audiovisual content (e.g., represented by the AR application data 228) that is displayed on the display 204. To detect and/or identify the physical object(s) 106, the AR application 216 may employ various object recognition algorithms and/or image recognition algorithms.

The AR application 216 may further generate and/or display interactive audiovisual content on the display 204. In one embodiment, the AR application 214 generates an interactive graphical user interface that the user 120 may use to interact with the AR application 216 and/or control various functions of the computing device 104. In addition, the computing device 104 may translate physical movements and/or gestures, performed by the user 120, as input for the graphical user interface.

The IMU conversion module 218 is configured to convert measurements and/or data obtained by the IMU 304 into one or more inputs usable by the GUI display module 220. The data obtained by the IMU 304 may be stored as IMU data 232. Using transformation matrices known to one of ordinary skill in the art, the IMU conversion module 218 may execute one or more mathematical operations that transform IMU data 232 into a format or input usable by the GUI display module 220. Examples of mathematical operations that the IMU conversion module 218 may perform on the IMU data 232 are discussed in the non-patent literature article "A Guide To Using IMU (Accelerometer and Gyroscope Devices) in Embedded Applications" by Sergiu Baluta and available via the Internet at the Uniform Resource Location (URL) of http://www.starlino.com/imu_guide.html, which is incorporated by reference herein in its entirety. The IMU conversion module 218 may convert the IMU data 232 into such information as whether the user 120 is rotating the computing device 104 and the direction of such rotation, an angle at which the user 120 is rotating or moving the computing device 104, changes in the speed at which the user 120 is moving the computing device 104, and other such orientation and/or acceleration information. Some non-limiting examples of computing device 104 motion may be due to a user moving their head in a case that the computing device is head-worn, a user moving their hand in a case that the computing device is hand-held, a user moving their arm in a case that the computing device is wrist-worn, and/or combination thereof as suitable for particular uses. As discussed below, this transformed IMU data is used by the GUI display module 220 for example, and without limitation, in determining the location of a reticle that the user 120 may manipulate to select one or more interact-able items such as, and without limitation, menus, menu items, buttons, triggers, and/or other actionable graphical objects, wherein the selecting may actuate functions such as, and without limitation, activating an application (e.g., the AR application 216) and/or changing a state associated with a corresponding actionable graphical object and executable by the one or more processor(s) 202.

In the present embodiment, the GUI display module 220 is configured to display for example, and without limitation, graphical menus, graphical shapes, graphical keyboards, graphical buttons, and other actionable graphical objects via the display 204 for the user 120 to interact with the computing device 104. In one embodiment, the GUI display module 220 includes various sub- or internal modules 222-226 that facilitate the display of, and interactions with, the interactive graphical objects. In particular, the additional modules include a layout display module 222, a GUI response module 224, and a GUI state module 226.

In addition, the GUI display module 220 leverages various data 230-238 in displaying the actionable graphical objects via the display 204. The data used by the GUI display module 220 includes one or more GUI characters 230, one or more GUI layout(s) 234, various types of DUI resources 236, and various GUI thresholds 238, which are used to facilitate movement of a displayed reticle and the selection of actionable graphical objects and/or activation of an application associated with corresponding actionable graphical objects.

The GUI characters 230 include those alphanumeric characters that the GUI display module 220 may display in presenting one or more actionable graphical objects. In one embodiment, the alphanumeric characters include spoken language characters, written language characters, symbols, punctuation, and other such alphanumeric characters or combinations thereof. In addition, the GUI characters 230 may include words and/or phrases that also may be displayed as labels for various graphical buttons or other actionable graphical objects displayed by the GUI display module 220. Further still, the GUI characters 230 may include alphanumeric characters, words, and/or phrases in one or more languages, such as English, Russian, Chinese, Hebrew, Arabic, German, and other such languages or combinations of languages. In one embodiment, each set of alphanumeric characters, words, and/or phrases for a particular language are associated with an identifier (e.g., 1=English, 2=German, 3=Chinese, etc.), and the identifier is associated with a selectable and/or changeable user preference. Thus, when the user 120 is using the computing device 104, the user 120 can change the language of the alphanumeric characters, words, and/or phrases displayed on the actionable graphical objects by the GUI display module 220.

The GUI layout(s) 234 include one or more configurations (e.g., layouts) that define the manner in which GUI display module 220 renders particular displayed actionable graphical objects. As discussed with reference to FIGS. 4A-4F, the GUI layout(s) 234 may define the placement of various graphical elements (e.g., the coordinates on the display 204) associated with a particular layout. As known to one of ordinary skill in the art, the GUI layout(s) 234 may be defined programmatically in a format understood by the layout display module 222. Further still, the GUI layout(s) 234 may be associated with a unique or particular identifier, such that the user 120 may select a layout using the unique or particular identifier. The selection of a particular layout may be determined based on IMU data 232 provided by the IMU 304, converted and/or interpreted by the IMU conversion module 218, and then interpreted or understood by one or more modules of the GUI display module 220, such as the layout display module 222.

The GUI resources 236 include one or more resources that the GUI display module 220 uses to display one or more actionable graphical portions of displayed actionable graphical objects, wherein the displayed actionable graphical objects may include one or a multiplicity of actionable graphical portions which may each be associated with distinct function actuations respectively. The GUI resources 236 include graphic content (e.g., images stored in a graphic format), audio content (e.g., audio files stored in an audio format), Cascading Style Sheet (CSS) files, associations between executable applications or other function actuations and actionable graphical portions, and other such resources or combinations thereof. In one embodiment, the GUI display module 220 references the GUI resources 236 when the graphical user interface is displayed and/or while the user 120 is interacting with the displayed graphical user interface.

The GUI thresholds 238 include various thresholds that are used by the GUI display module 220 to determine intentional movements to perform a selection by the user 120 and thereby distinguish between intentional movements to perform a selection and those movements which may be unrelated to actuating functions and/or applications associated with the graphical user interface displayed by the GUI display module 220. These thresholds may include, but are not limited to, timing thresholds, positional thresholds, angular thresholds, acceleration thresholds, and any other such thresholds or combinations thereof, such as a sequence of positional thresholds within a timing threshold/range. As a user 120 interacts with a displayed actionable graphical object, one or more modules of the GUI display module 220, such as the GUI response module 224 and/or the GUI state module 226, are configured to compare received (and/or converted) IMU data 232 with the defined one or more GUI thresholds 238. Further examples of thresholds are discussed with reference to an exemplary interaction with an exemplary displayed graphical menu as illustrated in FIGS. 4A-4F.

FIGS. 4A-4F illustrate exemplary interactions with an exemplary graphical user interface 402 implemented by a computing device according to example embodiments of the present invention.

Figure 4A:
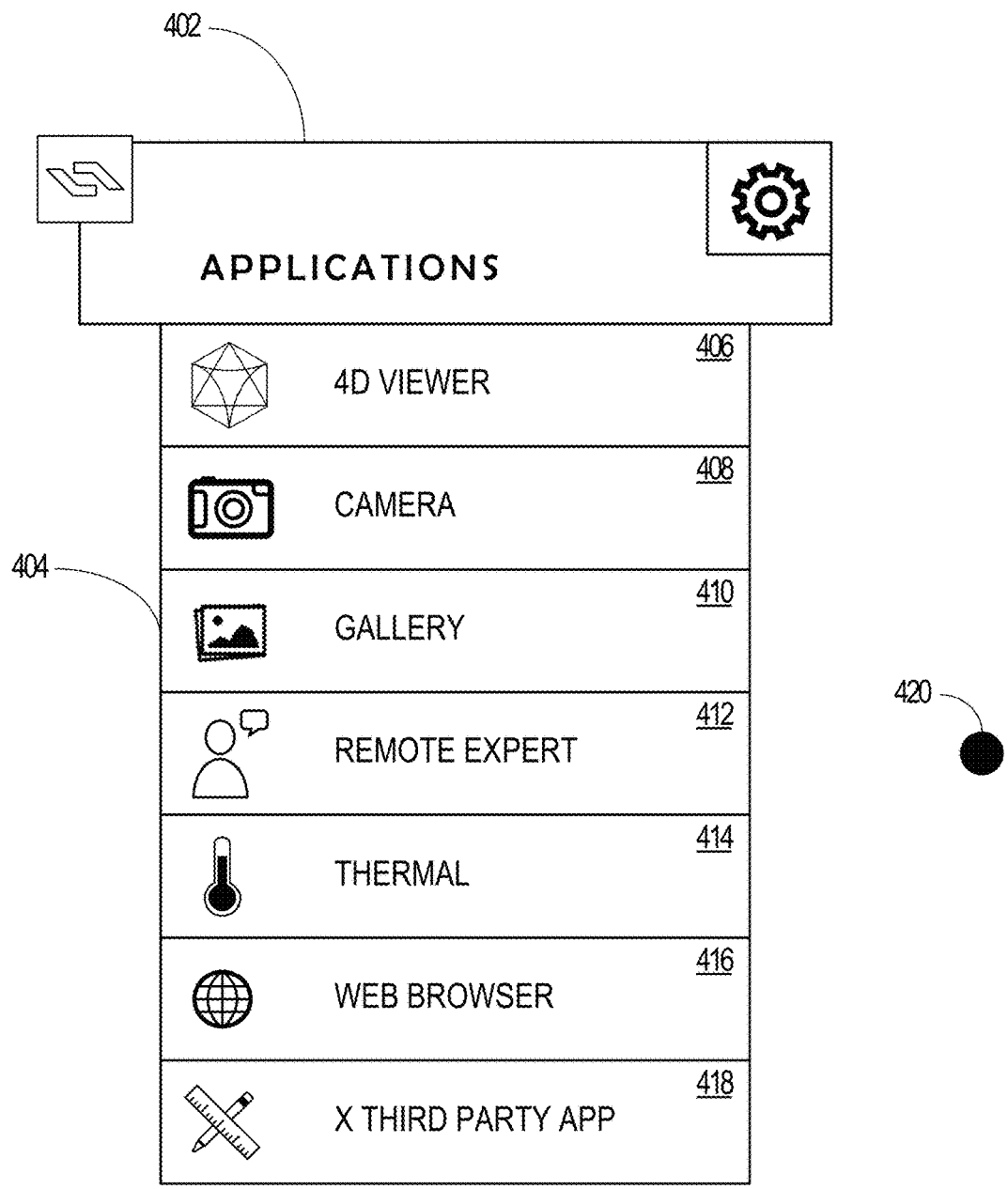
FIGS. 4A-4F illustrate exemplary interactions with an exemplary graphical user interface implemented by a computing device according to example embodiments of the present invention.

Referring initially to FIG. 4A, the GUI display module 220 is configured to display a graphical user interface 402. In the present embodiment, graphical user interface 402 includes a graphical menu representing an actionable graphical object, wherein the graphical menu further includes a primary menu 404 that has one or more menu items 406-418 which represent actuatable graphical portions of the graphical menu. In one embodiment, each menu item 406-418 is associated with a corresponding application/function actuation executable by one or more of the processor(s) 202. In addition, while not illustrated in FIG. 4A, the primary menu 404 may have one or more secondary menus, wherein a secondary menu is associated with a corresponding menu item 406-418. Accordingly, in this manner, the graphical menu 402 may be configured as a hierarchical tree structure, where the primary menu 402 is a root node of the hierarchical tree structure, each sub-menu is a node of the primary menu 402, and each menu item is a leaf node of the hierarchical tree structure.

In addition, the GUI layout(s) 234 may include a layout definition that defines the location of the one or more menu items 406-418 (or one or more sub-menus) relative to the display 204. For example, the GUI layout(s) 234 may include a layout definition where the menu items 406-418 are displayed substantially vertical relative to the display 204 (e.g., each menu item may be associated with a similar X-coordinate value but substantially different Y-coordinate values). In another embodiment, the GUI layout(s) include a layout definition where the menu items 406-418 are displayed substantially horizontal relative to the display 204 (e.g., each menu item may be associated with a similar Y-coordinate value but substantially different X-coordinate values). Other layout definitions are also possible, where the various menu items 406-418 are displayed at various positions on the display 204.

In displaying the menu items 406-418, the GUI display module 220 references the GUI resources 236 for retrieving the text, icons, coloring, and so forth, associated with each of the menu items 406-418. Furthermore, as a user 120 interacts with the menu items 406-418, the GUI display module 220 updates the coloring and/or shading of the menu items 406-418 according to an activity state associated with the location of a reticle 420. As discussed below, depending on whether the reticle 420 is located on or off a given menu item 406-418, the GUI display module 220 may display the menu item 406-418 with a predetermined display effect, including for example, and without limitation, coloring, animation, size, lighting or other such characteristic or combinations of characteristics. In one exemplary embodiment, the reticle 420 may be determined to be located on a given menu item, wherein tracking vertical and/or horizontal position changes of the reticle within the given menu item may cause the GUI display module 220 to dynamically adjust a display effect related to the given menu item. The display effect may include, for example, and without limitation, increasing and/or decreasing an edge brightness of the given menu item based on the tracked position of the reticle, wherein edge points of the given menu item that are determined to be within a predetermined positional range, with respect to a determined current reticle position, are rendered with an increased brightness and/or color alteration while edge points of the given menu item that are determined to be outside of the predetermined positional range are rendered with a decreased brightness and/or without color alteration.

In implementing the reticle 420, the reticle 420 corresponds to movements by the user 120 and as interpreted by the IMU 304. The IMU conversion module 218 is configured to convert one or more measurements of the IMU data 232 into values used as input to the GUI display module 220, which then displays the reticle 420 accordingly. In one embodiment, IMU conversion module 218 converts the received IMU data 232 to one or more acceleration and/or orientation vectors, which are then used by the GUI display module 220 to determine the movement and/or location of the reticle 420. In one embodiment, the GUI display module 220 may compare the acceleration and/or orientation vectors with one or more acceleration and/or orientation thresholds, stored as GUI thresholds 238, to determine the location and/or placement of the reticle 420 relative to the displayed graphical menu 402. In this manner, as the user 120 moves the wearable computing device 104, the reticle 420 changes position relative to the display 204 and the graphical user interface 402 in a corresponding way.

With reference to FIG. 2, the GUI response module 224 and the GUI state module 226 are configured to manage and determine the selection of one or more menu items 406-418, and the state of a given menu item 406-418 depending on the location of the reticle 420. In one embodiment, the GUI resources 236 include a variety of activity states, which indicate the behavior and display of a given actuatable graphical object and/or portion. These activity states include, but are not limited to: a RETICLE OFF state, where the reticle 420 is not located on a given actuatable graphical object and/or portion; a HOVER state, where the reticle 420 is located on a given actuatable graphical object and/or portion at a predetermined location away from a given edge; one or more EDGE states, where the reticle 420 is located on a actuatable graphical object and/or portion and located at a predetermined distance from a given edge; and an ACTIVATION state, where the reticle 420 is moved across a given actuatable graphical object and/or portion to execute an application and/or function actuation associated with the corresponding actuatable graphical object and/or portion.

The size and/or coloring of the menu item 410, for example, and without limitation, may be dependent on the state of the menu item as determined by the GUI state module 226. In one embodiment, the GUI resources 236 include a two-dimensional matrix, table, or other logical construct, where the rows of the two-dimensional matrix correspond to activity states and the columns correspond to attributes of a GUI. Such attributes may include GUI portion size(s), GUI portion coloring, GUI portion animation(s), GUI portion edge appearance(s), and other such attributes or combination of attributes. In this embodiment, the GUI response module 224 references the activity state, as determined by the GUI state module 226, to determine the attributes of a given menu item. Using the determined menu item attributes, the GUI display module 220 displays the menu item accordingly.

In FIG. 4A, the GUI state module 226 has assigned the RETICLE OFF state to each of the menu items 406-418 as the reticle 420 is not located on any of the menu items 406-418. As the user moves the computing device 104, the GUI display module 220 may control the display of the reticle 420 by translating one or more orientation vectors and/or one or more acceleration vectors from the IMU conversion module 218 to corresponding pixel values of the reticle 420. For example, and without limitation, a predetermined amount of rotational difference may correspond to a predetermined change in pixel values. In this manner, a two-degree orientation difference (e.g., in the X- and/or Y-axis) may result in a three- or five-pixel value difference (e.g., in the corresponding axis). Thus, where the computing device 104 is a head-mounted device, rotations in the user's head result in real-time, or substantially real-time, corresponding changes to the displayed reticle 420.

Figure 4B:
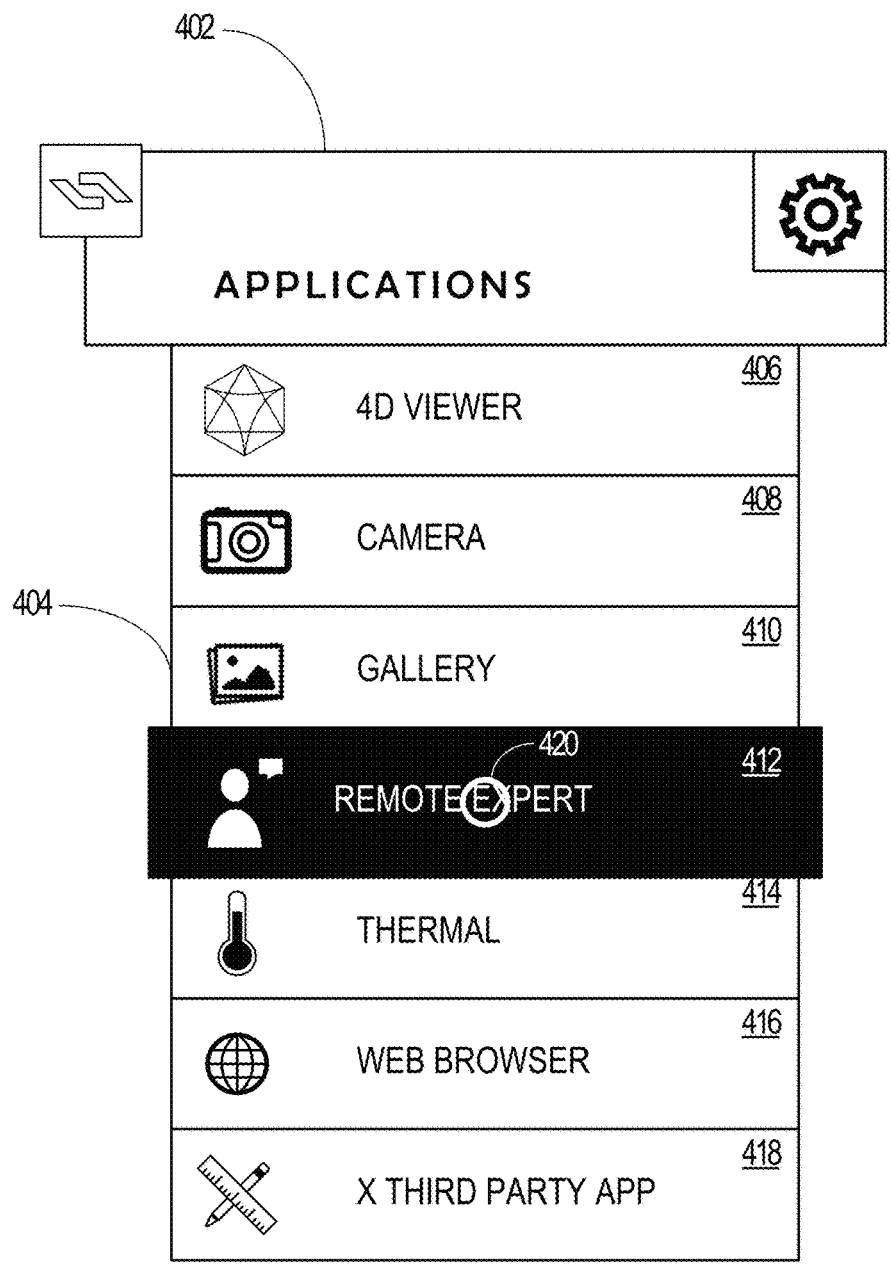

FIG. 4B illustrates an example where the user 120 has moved the reticle 420 to a menu item 412. In this example, the GUI state module 226 determines that the location of the reticle 420 corresponds to a location within the menu item 412. Furthermore, because the reticle 420 is a predetermined distance away from an edge of the menu item 412 (or at a predetermined location within the menu item 412), the GUI state module 226 determines that the state of the menu item 412 is HOVER. Using the HOVER state, the GUI response module 224 retrieves one or more GUI resources 236 associated with the HOVER state. In this regard, the HOVER state may be associated with an increase in the size of a given menu item and changes in the coloring of the menu item. With the resources, the GUI response module 224 changes the display of the menu item 412.

Figure 4C:
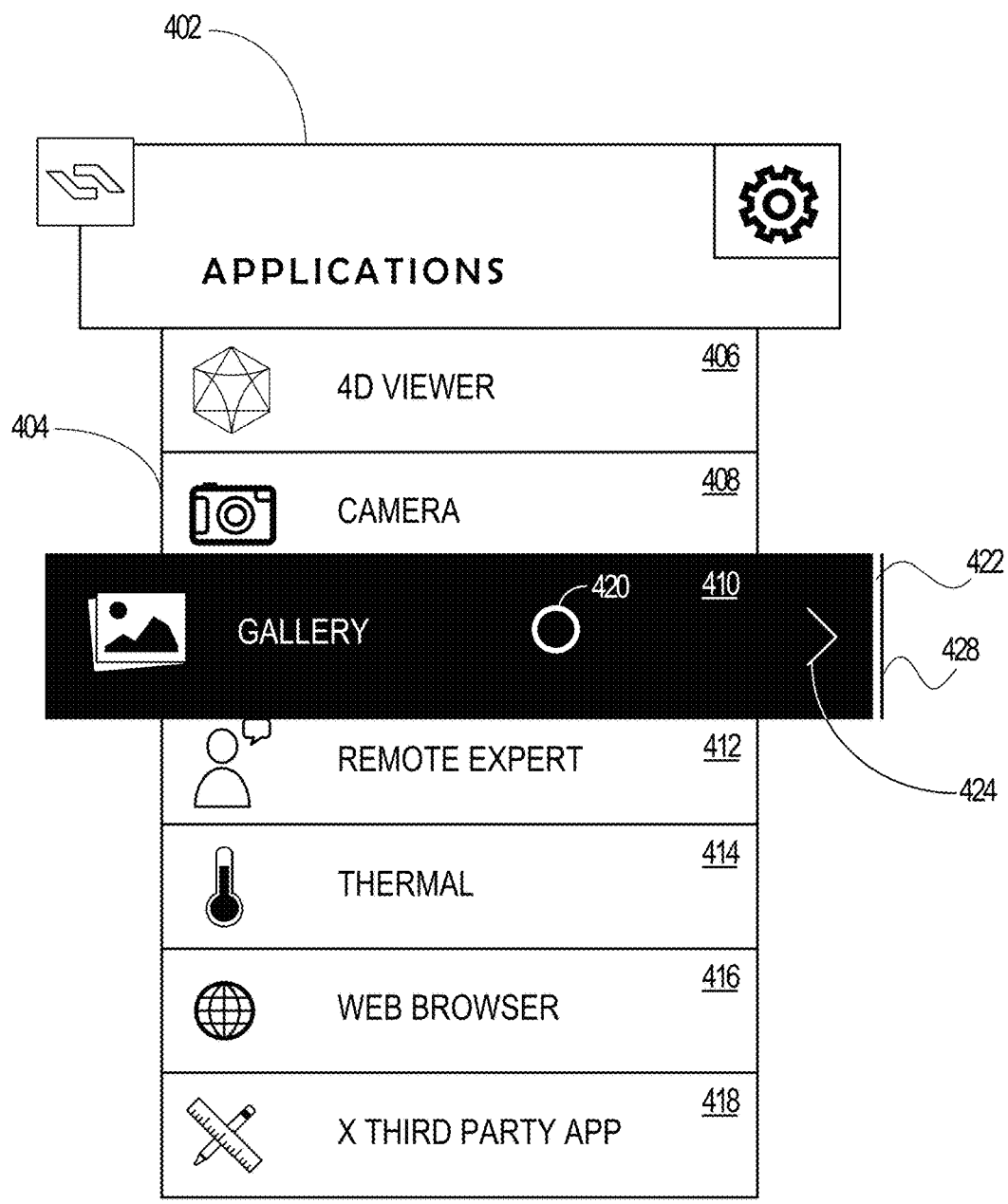
Figure 4D:
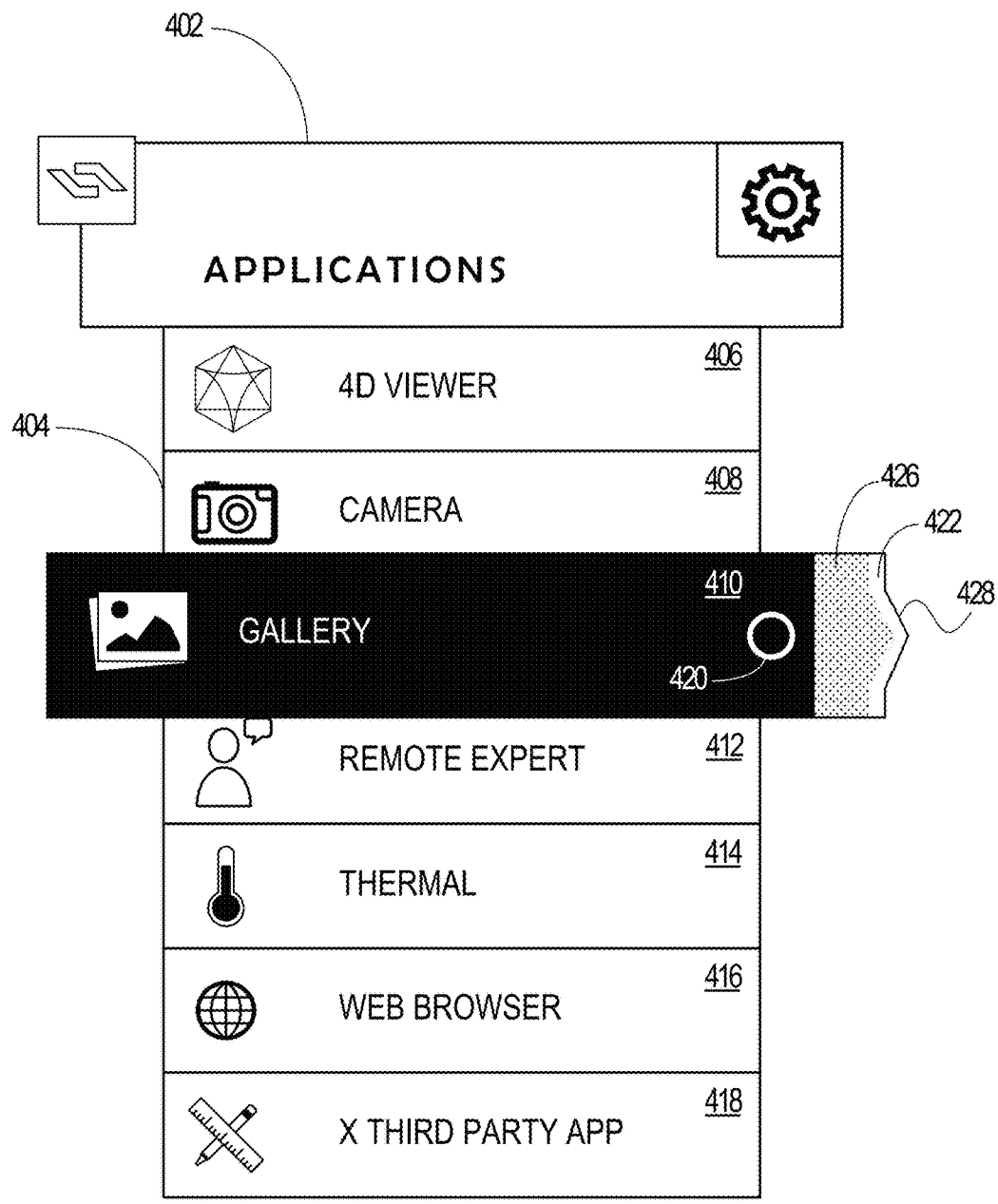
Figure 4E:
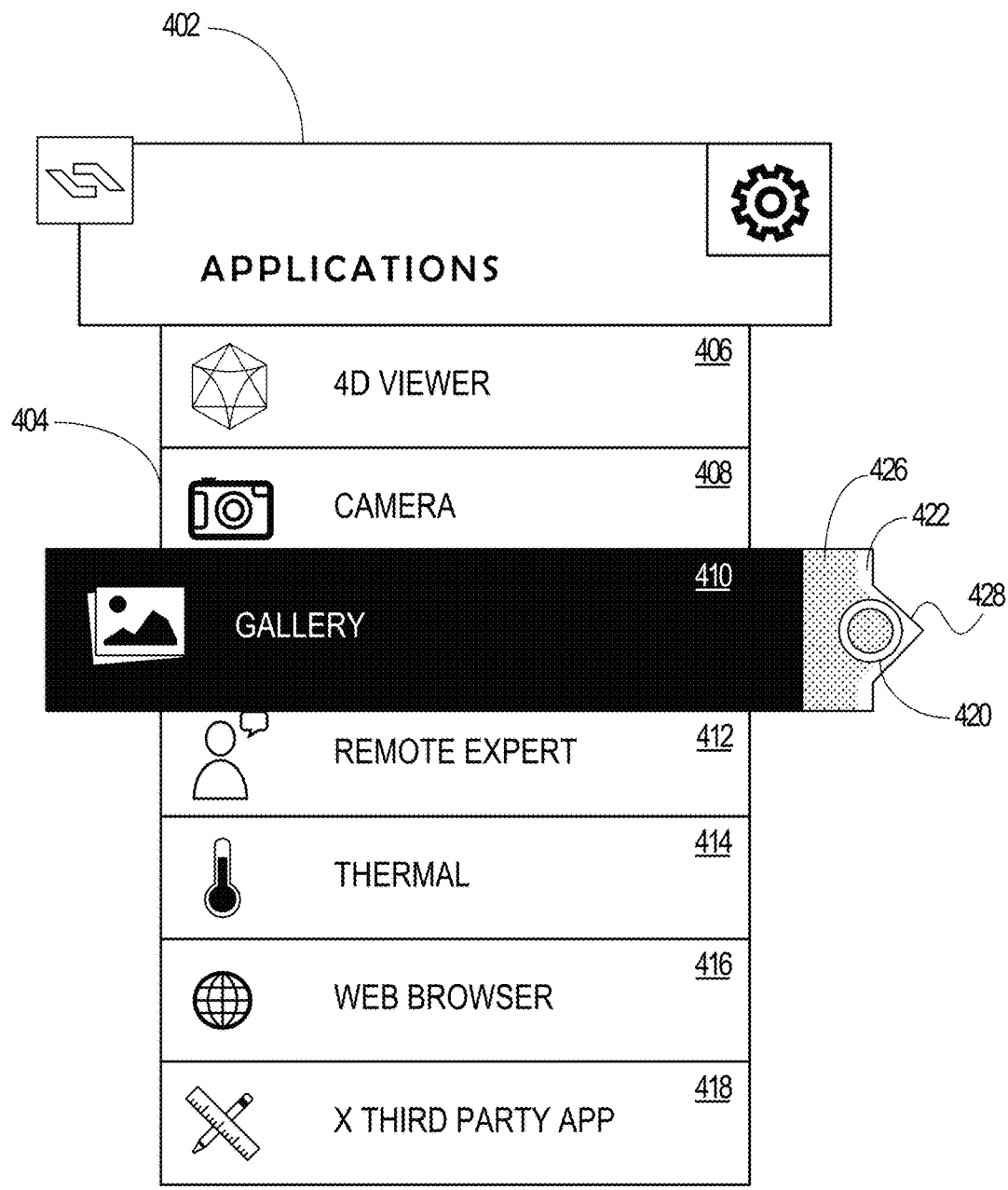

In one embodiment, the user 120 activates an application and/or a actuatable function associated with a given menu item by moving the reticle 420 to a predetermined edge of the given menu item, and then through the edge of such menu item. FIGS. 4C-4E illustrate one example of the reticle 420 moving through a menu item 410 and towards a predetermined edge 428.

To determine whether the user 120 is moving the reticle 420 towards the predetermined edge 428 to activate the application/actuatable function associated with the menu item 410, the data 214 includes various GUI thresholds 238 that the GUI response module 224 compares with the converted IMU data being provided by the IMU conversion module 218. In one embodiment, the GUI thresholds 238 include one or more orientation thresholds and one or more timing thresholds. In this regard, the orientation thresholds may define boundaries for a path in which the reticle 420 is expected to travel. Where the activation of the application and/or actuatable function associated with the menu item 410 occurs by traversing across the predetermined edge 428, the orientation thresholds may include for example, and without limitation, a top orientation threshold, a left orientation threshold, and a bottom orientation threshold, a right orientation, and/or otherwise angular orientation threshold with respect to an edge of an actuatable graphical object/portion. These orientation thresholds may define a path along which the reticle 420 is expected to travel. In the present embodiment, as the computing device 104 may be implemented as a head-mounted device for example, and without limitation, the top orientation threshold, the left orientation threshold, and the bottom orientation threshold may be measured in pixels, radians (rads.), or degrees (0). As the user 120 moves the reticle 420 towards the predetermined edge 428, the GUI display module 220 compares the converted IMU data with the various orientation thresholds to ensure that the user 120 is moving the reticle 420 along the defined path to the predetermined edge 428.

In addition to one or more orientation thresholds, the menu thresholds 238 may also include timing thresholds to ensure that the user 120 is moving the reticle 420 in a manner that indicates the user's intention to activate the application and/or actuatable function associated with the menu item 410. In one embodiment, the GUI display module 220 compares the timing of the received IMU data with the timing thresholds to determine whether the movement of the user 120 corresponds to expected movement to activate and/or execute an application and/or actuatable function associated with a corresponding menu item. For example, the timing thresholds may include an edge timing threshold of 500 milliseconds, which indicates that the reticle 420 should cross the edge 428 within 500 milliseconds to activate the application and/or actuatable function associate with the menu item 410. In this example, the GUI display module 220 may begin timing the reticle 420 when the reticle 420 is at a predetermined location within the menu item 410 or when the menu item 410 has entered a predetermined state, and may end timing the reticle 420 when the reticle 420 has crossed the edge 428. Additionally, and/or alternatively, the GUI display module 220 may compare one or more acceleration vectors provided by the IMU conversion module 218 with one or more acceleration vector thresholds to determine whether the movement of the user 120 is too fast (e.g., greater than the acceleration vector thresholds) or too slow (e.g., less than the acceleration vector thresholds). In this context, crossing the edge 428 may include that one or more portions of the reticle 420 has crossed the edge 428 or that the entirety of the reticle 420 has crossed the edge 428.

Referring to FIG. 4C is an example of the menu item 410 being in one of a plurality of EDGE states, where the reticle 420 is on the menu item 410 and is located a predetermined distance away from the edge 428, but has not yet reached the edge 428. In the example of FIG. 4C, when the menu item 410 is in this selected EDGE state, the GUI display module 220 may display the menu item 410 with a larger size, a different color, with an edge modifier 424, and with an edge indicator 422. In one embodiment, the edge modifier 424 is a graphical element that modifies the shape of the edge 428 as the user 120 moves the reticle 420 closer to the edge 428. Although shown as partial triangle in FIG. 4C, the edge modifier 424 may be displayed with any shapes such as a circle (or partial circle), a square (or partial square), a rectangle (a partial rectangle), or any other such shape. In addition, the edge indicator 422 is a graphical element that changes the coloring of the edge 428. In one embodiment, the GUI resources 236 define that the edge indicator 422 should change in brightness and/or color as the user 120 moves the reticle 420 closer to the edge 428.

FIG. 4D is another example of the menu item 410 being in another one of a plurality of EDGE states, where the reticle 420 is within the menu item 410 and is closer to the edge 428 than as illustrated in FIG. 4C. In the example illustrated in FIG. 4D, the GUI display module 220 has received further input, as converted IMU data, indicating that the user 120 has moved (or desires to move) the reticle 420 closer to the edge 428 of the menu item 410. By comparing the converted IMU data with the orientation thresholds, acceleration vector thresholds, and/or timing thresholds of the GUI thresholds 238, the GUI display module 220 determines that the reticle 420 should be moved closer to the edge 428. The GUI display module 220 may also compare one or more acceleration vectors with one or more acceleration vector thresholds to determine whether the user 120 is moving the computing device 104 too fast or too slow (e.g., which causes the reticle 420 to be rendered as perform corresponding movements).

In addition, the GUI state module 226 has determined that the menu item 410 should be transitioned to another EDGE state that changes one or more of the menu item's attributes, including the edge modifier 424 and the edge indicator 422. In the example shown in FIG. 4D, the GUI response module 224 has modified the edge 428 of the menu item 410 such that the edge 428 is no longer substantially parallel to an opposing edge of the menu item 410. Instead, the GUI response module 224 has modified the edge 428 to take on the shape of the edge modifier 424. In addition, the GUI response module 224 has applied a GUI animation 426 to the menu item 410. In this regard, the GUI animation 426 may appear as a glowing animation, where the colors of the GUI animation 426 transition between two or more colors.

Further still, the GUI response module 224 may change the appearance of the edge indicator 422 so as to increase the contrast between the edge 428 and the rest of the menu item 410. In this context, the GUI response module 224 may increase the amount of white color appearing in the edge indicator 422 so as to make the edge indicator 422 appear brighter than the dominant color of the menu item 410.

FIG. 4E is another example of the menu item 410 being in another one of a plurality of EDGE states, where the reticle 420 is within the menu item 410, but is now within the area assigned to the GUI animation 426 and/or the edge indicator 422. In this state, the GUI display module 220 may continue comparing one or more orientation and/or acceleration vectors provided by the IMU conversion module 218 in response to movements by the user 120 of the computing device 104. To activate the application/actuatable function associated with the menu item 410, the user 120 moves the reticle 420 through the edge 428. To determine whether the application and/or actuatable function should be activated, the GUI display module 220 may compare one or more orientation vectors provided by the IMU conversion module 218 with one or more orientation vector thresholds associated with, or that define, the edge 428. The GUI display module 220 may also compare one or more received acceleration vectors with one or more acceleration vector thresholds to determine whether the movement of the reticle 420 across the edge 428 was intended movement (e.g., that the movement was neither too fast nor too slow). That is, the GUI display module may determine that a user's movement of the computing device is an intended action to activate/initiate an application and/or actuatable function with respect to a actuatable graphical object and/or portion based on a comparison using predetermined thresholds.

Figure 4F:
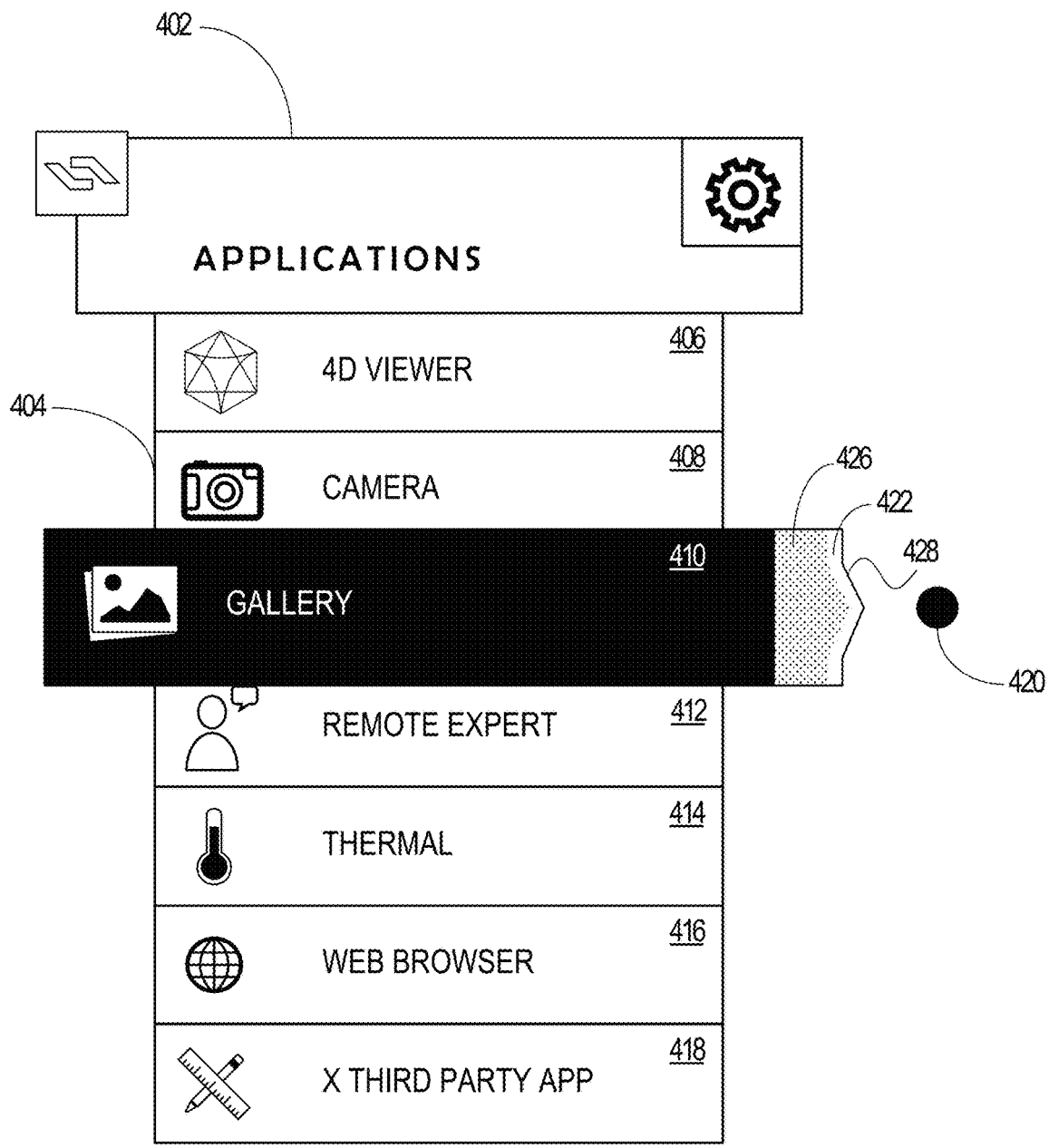

Referring to FIG. 4F is an example where the reticle 420 has passed through the edge 428 of the menu item 410. In the example illustrated in FIG. 4F, the menu display module 220 may determine that the application/actuatable function associated with the menu item 410 is to be activated in response to the reticle 420 passing through the edge 428. To make this determination, and as explained above, the GUI display module 220 may compare one or more orientation and/or acceleration vectors provided by the IMU conversion module 218 with corresponding orientation vector thresholds and/or acceleration vector thresholds. In addition, and in response to a determination that the application/actuatable function associated with the menu item 410 is to be activated, the GUI display module 220 may instruct the GUI state module 226 that the state of the menu item 410 should be changed to an ACTIVATION activity state. Additionally, and/or alternatively, the GUI state module 226 may independently determine that the menu item 410 should be assigned to an ACTIVATION activity state, such as by performing similar comparisons as the GUI response module 224. The GUI response module 224 may then execute and/or activate the application and/or actuatable function associated with the menu item 410. The GUI response module 224 may also apply and/or change one or more of the menu item attributes of the menu item 410 in response to the menu item 410 changing to the ACTIVATION state.

Finally, the GUI state module 226 may then return the menu item 410 to an initial state, such as the RETICLE OFF state. In turn, the GUI response module 224 may change the appearance of the menu item 410 to reflect the RETICLE OFF state (e.g., by referencing the one or more menu item attributes associated with the RETICLE OFF state).

Figure 5A:
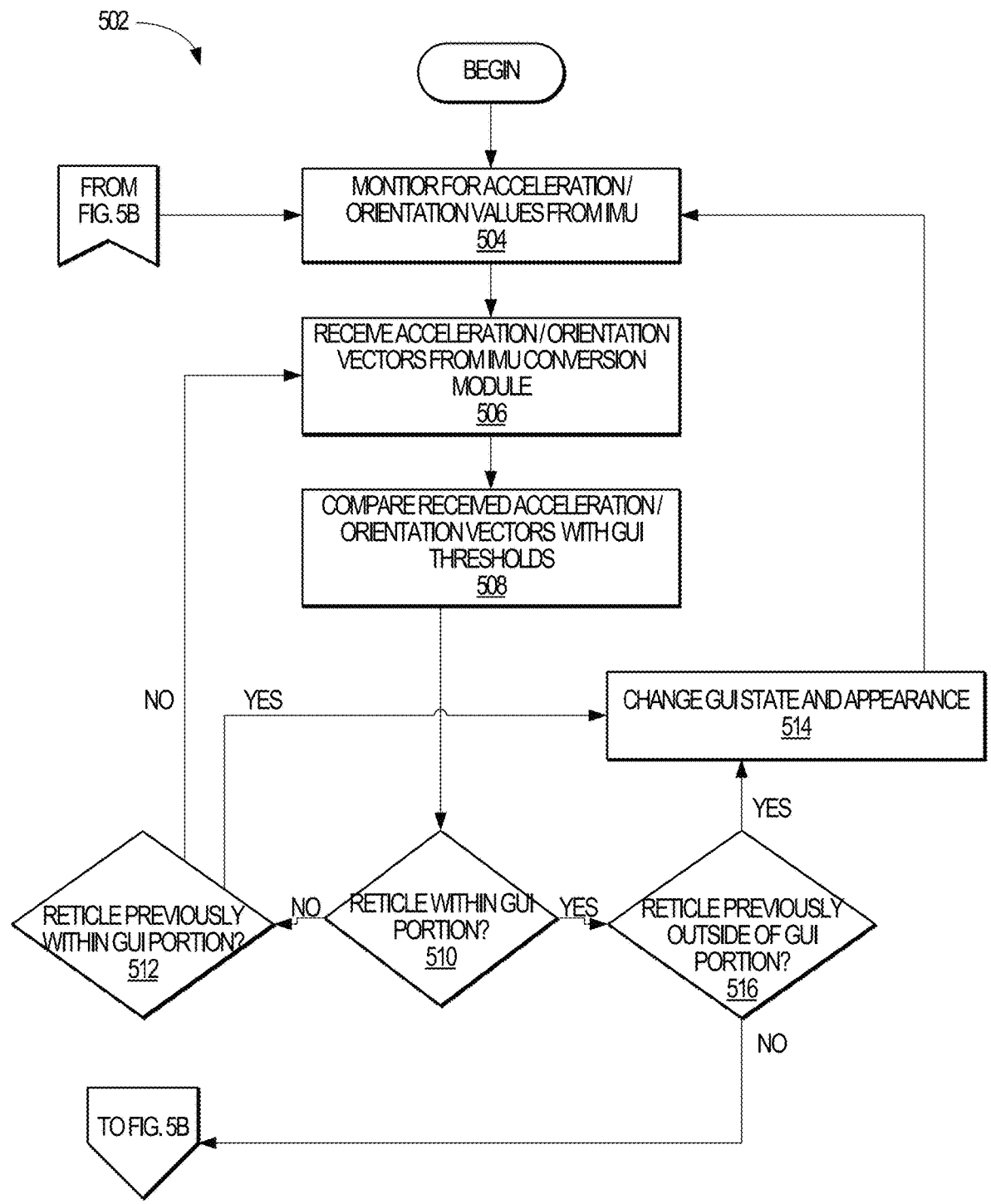
FIGS. 5A-5B illustrate an exemplary processing method implemented by a computing device according to an example embodiment of the present invention.
Figure 5B:
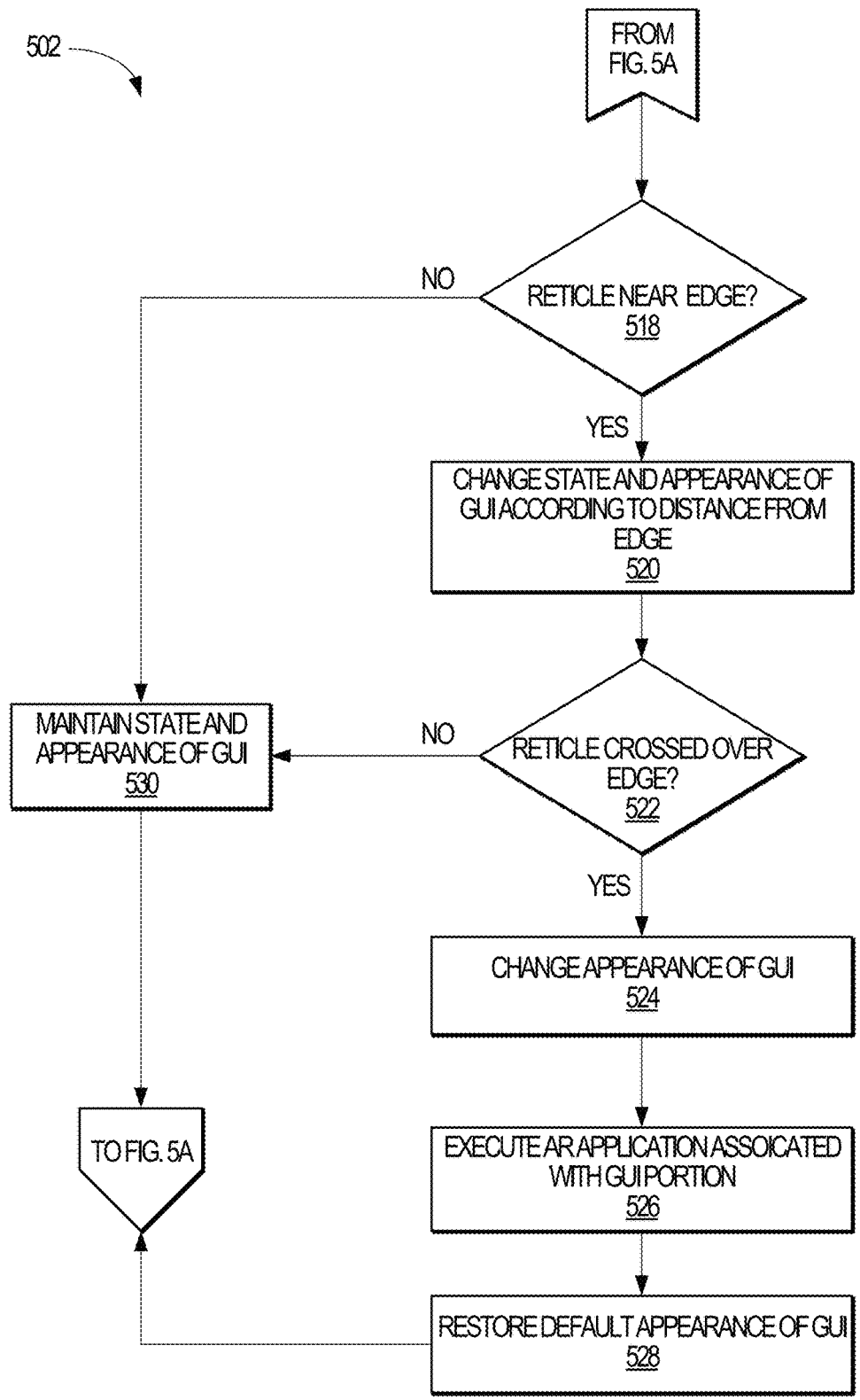
Figure 6A:
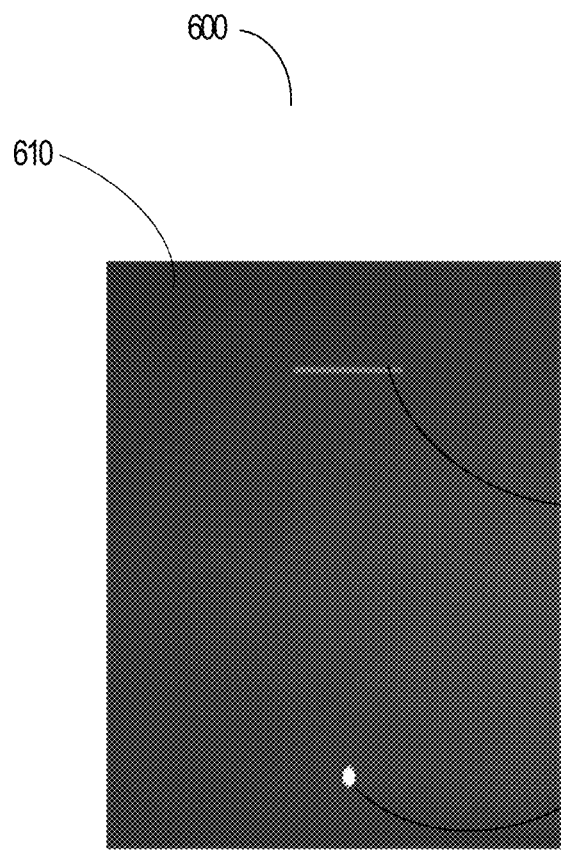
Figure 6B:
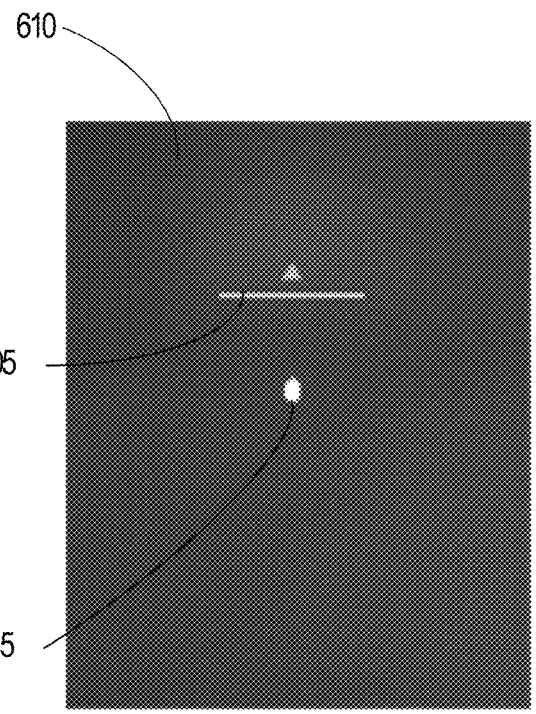
Figure 6C:
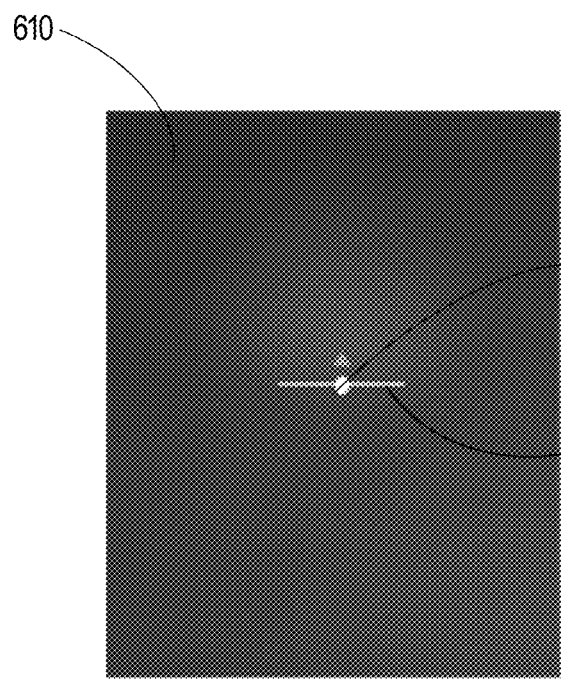
Figure 6D:
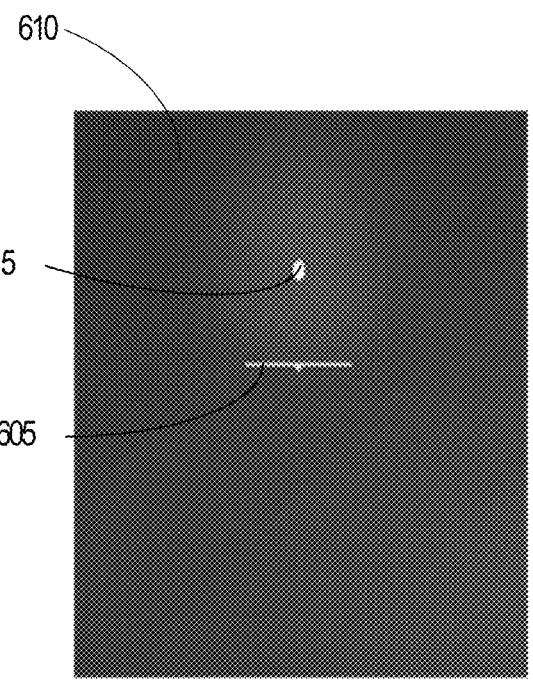
Figure 6E:
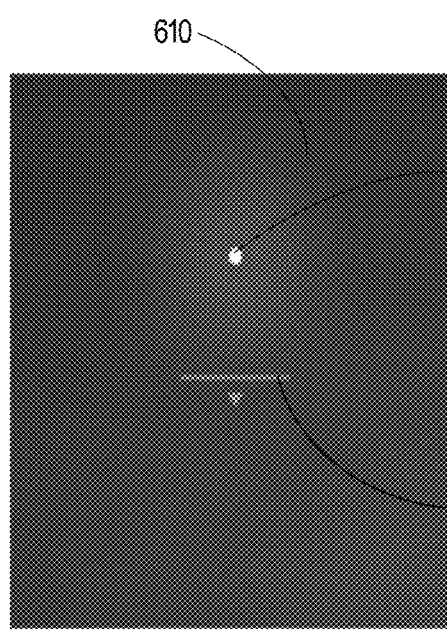
Figure 6F:
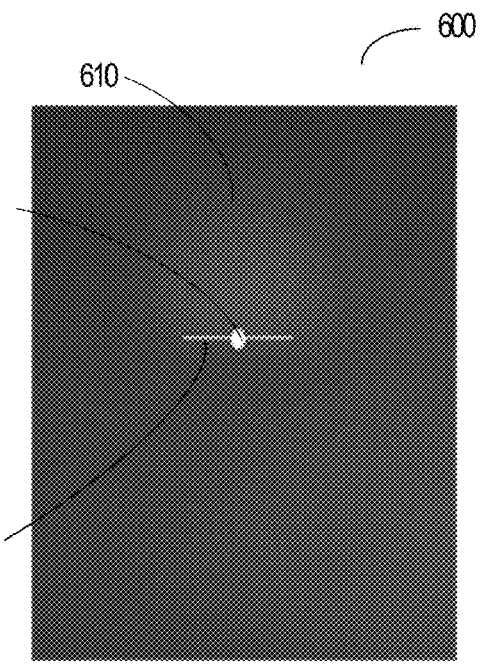
Figure 6G:
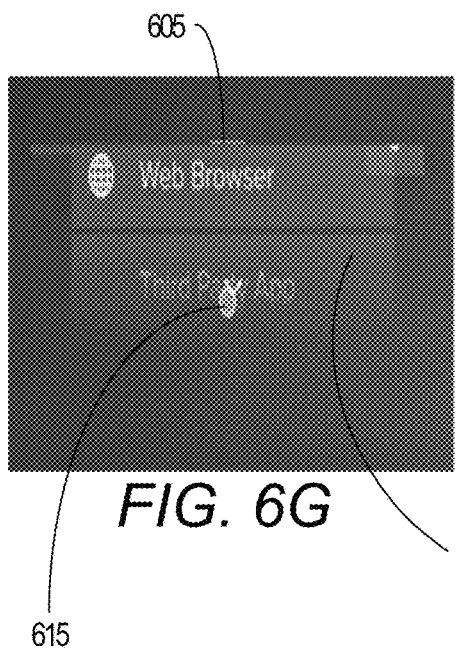
Figure 6H:
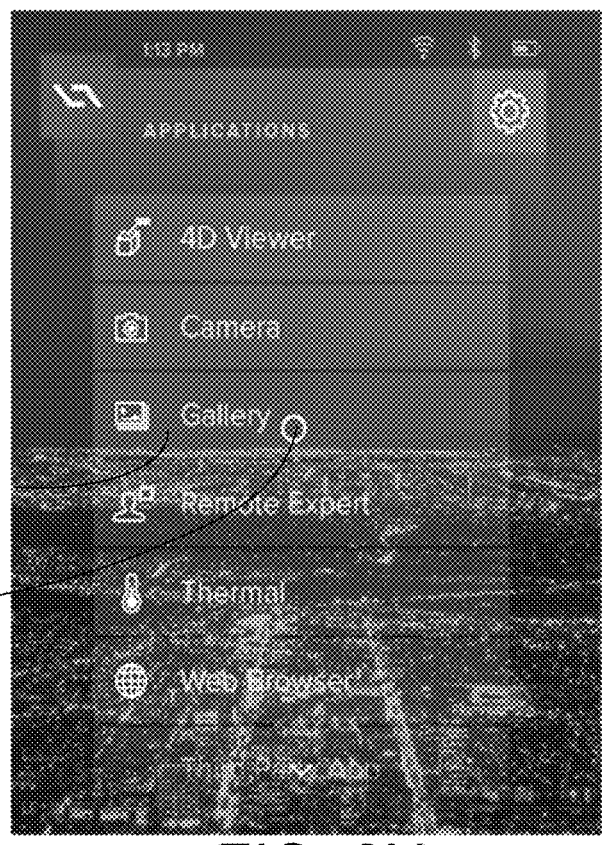

FIGS. 5A-5B illustrate an exemplary processing method 502 implemented by a computing device according to an example embodiment of the present invention. The processing 502 may be implemented by one or more of the components illustrated in FIGS. 1-2, and is discussed by way of reference thereto.

Initially, and while not specifically illustrated in FIG. 5A, the GUI display module 220 generates the graphical user interface 402 via the layout display module 222. As explained previously, the layout display module 222 may reference one or more GUI layout(s) 234 in displaying the graphical user interface 402. The layout display module 222 and/or the GUI display module 220 may also reference the GUI characters 230 to select those characters and/or symbols to display on the graphical user interface 402.

With the graphical user interface 402 displayed on the display 204, the GUI response module 224 begins monitoring for received IMU data via the IMU conversion module 218 in an operation 504. The GUI response module 224 then receives one or more acceleration and/or orientation vectors from the IMU conversion module 218 in an operation 506. Next, in an operation 508, the GUI response module 224 then compares the received orientation and/or acceleration vectors with one or more GUI thresholds 238 (e.g., one or more orientation vector thresholds and/or acceleration vector thresholds) to determine whether the reticle 420 should be moved and, if so, where the reticle 420 should be displayed relative to the graphical user interface 402.

Having moved the reticle 420, the GUI state module 226 may then perform one or more state determination operations that determine whether to change and/or assign a state to a given actuatable graphical object and/or portion (e.g., menu item 410). For example, the GUI state module 226 may determine whether the reticle 420 is within the actuatable graphical object and/or portion in a decision operation 510. In this operation, the GUI state module 226 determines whether the state of the actuatable graphical object/portion should be changed to the HOVER activity state. Where the GUI state module 226 determines that the reticle is not within the actuatable graphical object/portion (e.g., the "NO" branch of operation 510), the processing 502 proceeds to a decision operation 512.

At the decision operation 512, the GUI state module 226 determines whether the reticle 420 was within the actuatable graphical object/portion prior to being moved. In other words, the GUI state module 226 is determining whether the user 120 has moved the reticle 420 from a location within the actuatable graphical object/portion to a location outside of the actuatable graphical object/portion (e.g., outside of the graphical user interface 402 or onto another sub-portion of the graphical user interface). Where this determination is made in the affirmative (e.g., the "YES" branch of operation 512), the GUI state module 226 changes the state of the actuatable graphical object/portion and the GUI response module 224 changes the appearance of the actuatable graphical object/portion to correspond to the change in state in an operation 514. In this determination, the GUI state module 226 may change the actuatable graphical object/portion to a RETICLE OFF state. Where this determination is made in the negative (e.g., the "NO" branch of operation 512), the appearance and state of the menu item for example, is not changed, and the GUI display module 220 continues monitoring for one or more orientation vectors and/or acceleration vectors provided by the IMU conversion module 218. In other words, the GUI state module 226 may perform this determination where the reticle 420 is not located within a predetermined area associated with the actuatable graphical object/portion and was not located within the predetermined area previously.

Returning to decision operation 510, where the GUI state module 226 determines that the reticle 420 is within a predetermined area associated with the actuatable graphical object/portion (e.g., the "YES" branch of operation 510), the processing 502 proceeds to a decision operation 516. At decision operation 516, the GUI state module 226 determines whether the reticle 420 was previously located outside (e.g., not within) the predetermined area associated with the actuatable graphical object/portion. Where this determination is made in the affirmative (e.g., the "YES" branch of operation 516), the method 502 proceeds to operation 514, where the GUI state module 226 changes the state of the actuatable graphical object/portion and the GUI response module 224 changes the appearance of the actuatable graphical object/portion to correspond to the change in state. In this determination, the GUI state module 226 may change the state of the actuatable graphical object/portion to the HOVER state to reflect that the reticle 420 is located within the predetermined area associated with the actuatable graphical object/portion.

Where the determination of operation 516 is made in the negative (e.g., the "NO" branch of operation 516), the processing 502 proceeds to an operation 518 illustrated in FIG. 5B. At operation 518, the GUI state module 226 determines whether the reticle 420 is located near a predesignated edge of the actuatable graphical object/portion. In this determination, the GUI state module 226 may determine the location of the reticle 420 relative to the predesignated edge, such as the edge 428 illustrated in FIG. 4C, to determine the state of the actuatable graphical object/portion. Where the GUI state module 226 determines that the reticle 420 is located near the predesignated edge (e.g., within a predetermined distance or at a predetermined location), the processing 502 proceeds to an operation 520. Where this determination is made in the negative (e.g., the "NO" branch of operation 518), the processing 502 proceeds to operation 530, where the state of the actuatable graphical object/portion is not changed. From operation 530, the processing 502 returns to operation 504 of FIG. 5A.

At an operation 520, the GUI state module 226 changes the state of the actuatable graphical object/portion based on the location of the reticle 420 (e.g., relative to the menu item and/or menu item edge). For example, the GUI state module 226 may select a designated EDGE state from a plurality of EDGE states to reflect the state of the actuatable graphical object/portion. In response to the assignment of the selected EDGE state, the GUI response module 226 changes the appearance of the actuatable graphical object/portion and/or one or more components of the actuatable graphical object/portion (e.g., an edge indicator 422, an edge modifier 422, a menu animation 426, and/or the edge 428). The GUI state module 226 then further determines whether the reticle 420 has crossed over and/or passed through a predesignated edge (e.g., the edge 428) of the actuatable graphical object/portion in a decision operation 522. If this determination is made in the negative (e.g., the "NO" branch of operation 522), the processing 502 proceeds to operation 530. Alternatively, where this determination is made in the affirmative (e.g., the "YES" branch of operation 522), the processing 502 proceeds to operation 524. At operation 524, the GUI response module 226 may change the appearance of the actuatable graphical object/portion to reflect that the reticle 420 has passed through and/or crossed over the predesignated edge of the actuatable graphical object/portion. The computing device 104 then executes the application and/or actuatable function associated with the actuatable graphical object/portion in an operation 526. The GUI state module 226 may then return the actuatable graphical object/portion to a default and/or designated state (e.g., the RETICLE OFF state) following the execution of the application and/or actuatable function, and the GUI response module 226 may then change and/or update the appearance of the actuatable graphical object/portion to reflect the change in state of the actuatable graphical object/portion in an operation 528. The processing 502 then returns to operation 504 of FIG. 5A, where the GUI display module 220 awaits additional input from the IMU conversion module 218.

In this manner, this disclosure provides for a computing device 104 configured to display one or more intractable graphical user interfaces on a display 204 of the computing device 104, where the user 120 can provide input to manipulate one or more actuatable graphical objects/portions of the displayed one or more intractable graphical user interfaces through movements of the computing device. As discussed above, the computing device 104 includes an IMU 304, which gathers measurements along various axes of movement. These measurements are then converted to vectors, which are then provided as input to a GUI display module 220. The GUI display module 220 then interprets the movements as movements of a reticle 420, which is used to select one or more actuatable graphical objects/portions of the intractable graphical user interface, and/or activate an application and/or actuatable function associated with a given actuatable graphical object/portion. At least one technical benefit provided by the disclosed graphical user interface is that it creates a human/machine interface that allows the user 120 to interact with the computing device 104 and to provide input to the computing device 104 without having to use a traditional, hardware keyboard or other physical input device (e.g., a mouse).

Some embodiments of the foregoing description exemplify a dynamic menu as an interactive GUI layout provided and processed by GUI display module 220 with respect to exemplary user inputs. In some other exemplary embodiments, a GUI may include other actionable graphical objects and various combinations of computing device movements that are displayed as reticle 420, and interpreted, as described above, by IMU conversion module 218, wherein the movements may be associated with actuating functions such as, and without limitation, activating an application (e.g., the AR application 216) and/or changing a state associated with a corresponding actionable graphical object and executable by the one or more processor(s) 202.

FIGS. 6A-6I illustrate exemplary interactions 600 with another exemplary graphical user interface implemented by a computing device according to example embodiments of the present invention. More specifically FIGS. 6A-6I illustrate another example of a GUI layout and activity state changes in accordance with an embodiment of the present invention. In the present embodiment, the GUI includes a dynamic bar 605 displayed in a display 610 of a computing device being used by a user. The user may move the computing device such that a reticle 615 may move from below the dynamic bar, crossing the dynamic bar to a position located above the dynamic bar, and within a predetermined period of time, as defined by a predetermined timing threshold, move the reticle down, across the dynamic bar in order to actuate an application and/or actuatable function. In the present embodiment, this exemplary sequence of movements actuates a multiplicity of state changes that include displaying another actuatable graphical object (e.g. a menu 620), indicator displays, and a minimization and disappearance of a previously displayed actuatable graphical object (e.g. dynamic bar 605). In the present embodiment, the modules 212 of the computing device operate similarly as described in the above examples, wherein data 214 includes predefined data suitable for the present application. In some alternative embodiments, the IMU conversion 218 may interpret the computing device moving such that a reticle intersects an actuatable graphical object, such as a bar, or other polygonal shape, for a predetermined amount of time and/or for a predetermined distance as defined by a timing and/or distance threshold in GUI thresholds 238. Furthermore, the user moving the computing device such that the IMU conversion 218 interpretation is used to illustrate the reticle no longer intersecting the actuatable graphical object, may result in a particular function execution by one or more processors 202, based on a particular angle of intersection ending. That is, ending an intersection at a first angle may be associated with a first function, and ending an intersection at a second angle may be associated with a second function, wherein the first and second angles are distinct and the first and second functions are distinct. In some other embodiments, there may be substantially any number of end intersection angles associated with substantially any number of executable functions.

Figure 7A:
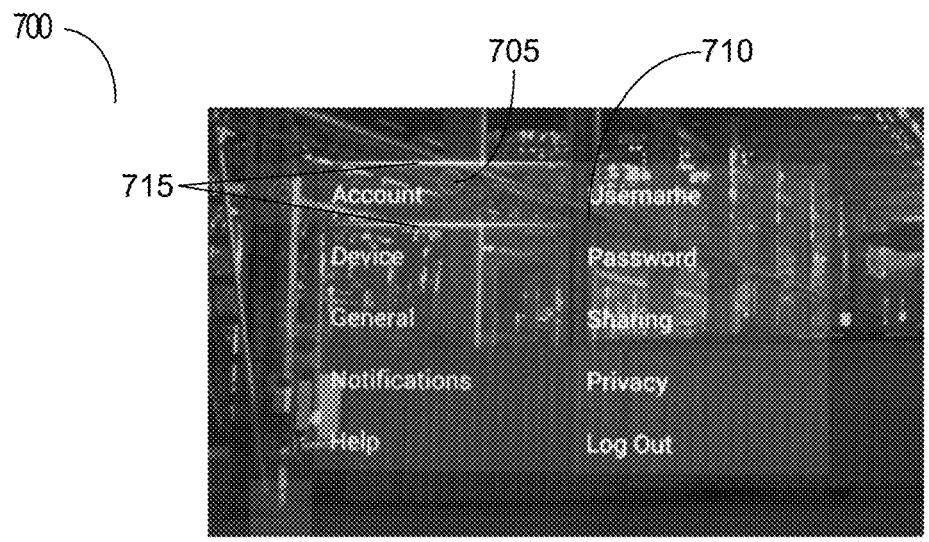
FIGS. 7A-7C illustrate another other exemplary GUI state change 700 in accordance with some embodiments of the present invention.
Figure 7B:
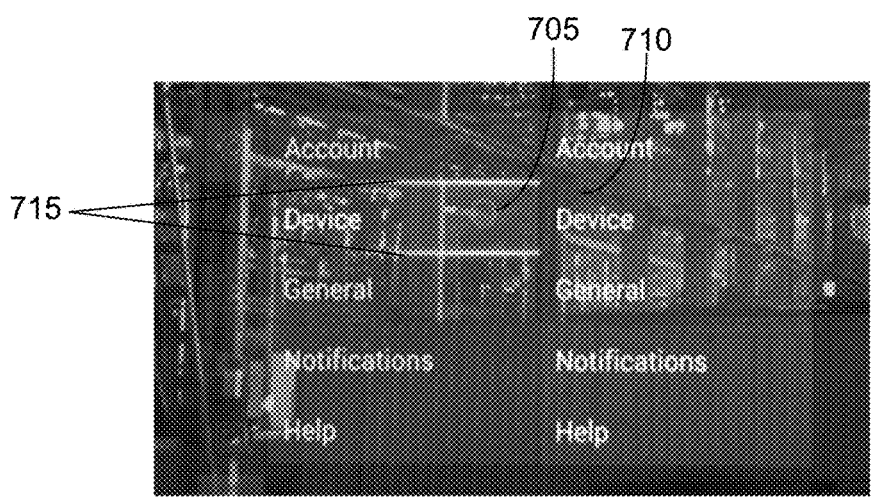
Figure 7C:
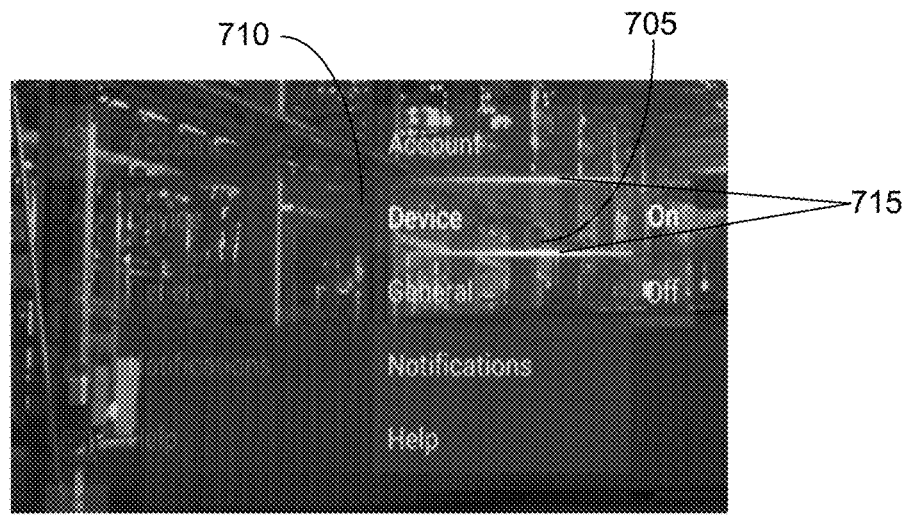

As described above, an appearance of a displayed GUI may be altered based on a position of a reticle as the reticle moves with respect to the GUI. FIGS. 7A-7C illustrate another other exemplary GUI state change 700 in accordance with some embodiments of the present invention. In the present embodiment, an edge and/or other portion of a GUI may change in brightness and/or other display affect based on a determined reticle position. As a reticle 705 is moved across an actuatable graphical object (e.g. a menu 710), the reticle position is tracked as described above, an appearance of the actuatable graphical object and/or portion thereof (e.g. one or more menu edges 715) may be altered based on the reticle position with respect to a position of the actuatable graphical object/portion.

Modules, Components, and Logic

Certain embodiments are described herein as including logic or a number of components, modules, or mechanisms.

Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 8:
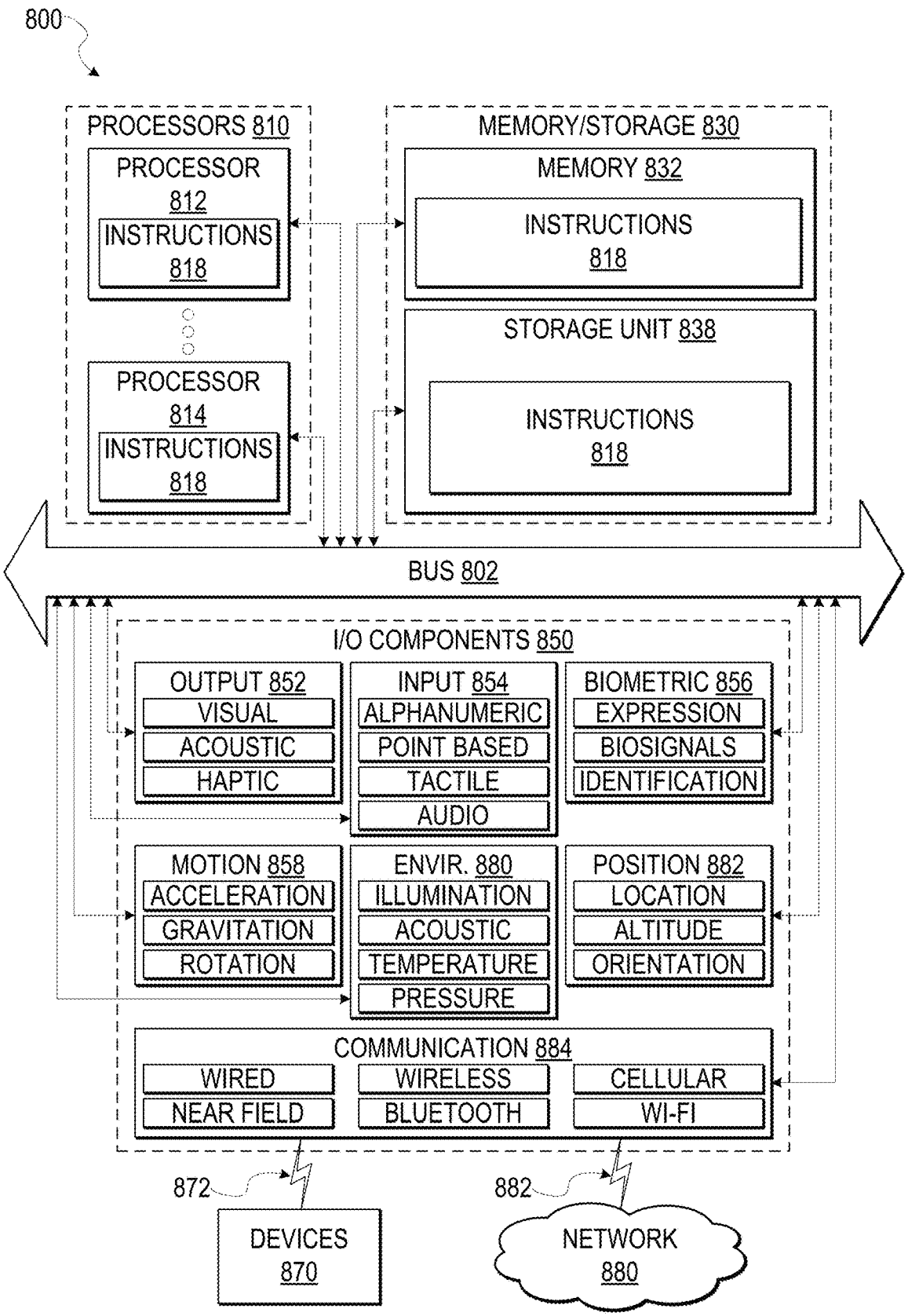
FIG. 8 illustrates a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 818 (e.g., software, a program, an application, an applet, an app, or other executable code) for causing the machine 800 to perform any one or more of the methodologies discussed herein may be executed. For example, the instructions may cause the machine to execute the method illustrated in FIGS. 5A-5B. Additionally, or alternatively, the instructions may implement one or more of the modules 212 illustrated in FIG. 2 and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch, head mounted device, or the like), a smart home device (e.g., a smart appliance), other smart devices, a web appliance, a network router, a network switch, a network bridge, or any machine capable of executing the instructions 818, sequentially or otherwise, that specify actions to be taken by machine 800. Further, while only a single machine 800 is illustrated, the term "machine" shall also be taken to include a collection of machines 800 that individually or jointly execute the instructions 818 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 812 and processor 814 that may execute instructions 818. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 838, both accessible to the processors 810 such as via the bus 802. The storage unit 838 and memory 832 store the instructions 818 embodying any one or more of the methodologies or functions described herein. The instructions 818 may also reside, completely or partially, within the memory 832, within the storage unit 838, within at least one of the processors 810 (e.g., within the processor's cache memory), or any suitable combination thereof, during execution thereof by the machine 800. Accordingly, the memory 832, the storage unit 838, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 818. The term "machine-readable medium" shall also be taken to include any medium, or combination of multiple media, that is capable of storing instructions (e.g., instructions 818) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 880, or position components 882 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 880 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 882 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 884 operable to couple the machine 800 to a network 880 or devices 870 via coupling 882 and coupling 872 respectively. For example, the communication components 884 may include a network interface component or other suitable device to interface with the network 880. In further examples, communication components 884 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 884 may detect identifiers or include components operable to detect identifiers. For example, the communication components 884 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 884, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 818 may be transmitted or received over the network 880 using a transmission medium via a network interface device (e.g., a network interface component included in the communication components 884) and utilizing any one of a number of well-known transfer protocols (e.g., hypertext transfer protocol (HTTP)). Similarly, the instructions 818 may be transmitted or received using a transmission medium via the coupling 872 (e.g., a peer-to-peer coupling) to devices 870. The term "transmission medium" shall be taken to include any intangible medium that is capable of storing, encoding, or carrying instructions 818 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A computing device having a display that displays a graphical user interface for interacting with the computing device, the computing device comprising:
   a machine-readable memory storing computer-executable instructions; and
   at least one hardware processor in communication with the machine-readable memory that, when the computer-executable instructions are executed, configures the computing device to perform a plurality of operations, the plurality of operations comprising:
   displaying, on a display in communication with the at least one hardware processor, a graphical user interface, the graphical user interface having at least one actuatable portion associated with an application executable by the computing device, wherein the at least one actuatable portion comprises an edge of the displayed graphical user interface;
   acquiring, by at least one inertial measurement unit, a plurality of measurements indicating user movement of the computing device;
   converting the plurality of measurements to obtain a plurality of vectors, wherein at least one vector of the plurality of vectors is associated with at least three axes of movement;
   displaying a position indicator that moves in response to the plurality of vectors;
   determining that the position indicator is at a predetermined distance from the edge of the at least one actuatable portion;
   changing an appearance of the actuatable portion in response to the determination that the position indicator is at the predetermined distance from the edge of the at least one actuatable portion;
   determining whether the position indicator has traversed the edge of the at least one actuatable portion;
   determining a command to perform with the displayed graphical user interface in response to:
   a determination that the position indicator has traversed the edge of the at least one actuatable portion; and
   a determination that the position indicator traversed the edge of the at least one actuatable portion within a predetermined timing threshold of when the position indicator reached the predetermined distance; and
   performing the determined command with the displayed graphical user interface.

2. The computing device of claim 1, wherein the plurality of operations further comprise:
   comparing one or more values of the plurality of vectors with a plurality of corresponding thresholds, wherein at least one of the plurality of thresholds is associated with the command to perform; and
   the determining of the command to perform is further based on the comparison.

3. The computing device of claim 1, wherein the at least one actuatable portion is associated with a plurality of activity states, and the command to perform causes the actuatable portion to change from a first activity state to a second activity state.

4. The computing device of claim 3, wherein:
   the change from the first activity state to the second activity state causes a corresponding change in at least one actuatable portion attribute associated with the at least one actuatable portion.

5. The computing device of claim 1, wherein the command comprises:
   moving the position indicator to a predetermined area of the at least one actuatable portion; and
   executing at least one application associated with the at least one actuatable portion based on the movement of the position indicator to the predetermined area.

6. The computing device of claim 1, wherein:
   the determined command causes a change in an appearance of the actuatable portion based on the plurality of vectors and the edge.

7. A method for displaying a graphical user interface on a display of a computing device, the method comprising:
   displaying, on a display in communication with the at least one hardware processor, a graphical user interface, the graphical user interface having at least one actuatable portion associated with an application executable by the computing device, wherein the at least one actuatable portion comprises an edge of the displayed graphical user interface;
   acquiring, by at least one inertial measurement unit, a plurality of measurements indicating user movement of the computing device;
   converting, by the at least one hardware processor, the plurality of measurements to obtain a plurality of vectors, wherein at least one vector of the plurality of vectors is associated with at least three axes of movement;
   displaying a position indicator that moves in response to the plurality of vectors;
   determining that the position indicator is at a predetermined distance from the edge of the at least one actuatable portion;
   changing an appearance of the actuatable portion in response to the determination that the position indicator is at the predetermined distance from the edge of the at least one actuatable portion;
   determining whether the position indicator has traversed the edge of the at least one actuatable portion;
   determining, by the at least one hardware processor, a command to perform with the displayed graphical user interface in response to:
   a determination that the position indicator has traversed the edge of the at least one actuatable portion; and
   a determination that the position indicator traversed the edge of the at least one actuatable portion within a predetermined timing threshold of when the position indicator reached the predetermined distance; and
   performing, by the at least one hardware processor, the determined command with the displayed graphical user interface.

8. The method of claim 7, wherein the method further comprises:
   comparing, by the at least one hardware processor, one or more values of the plurality of vectors with a plurality of corresponding thresholds, at least one of the thresholds selected from the plurality of thresholds associated with the command to perform; and
   the determining of the command to perform is further based on the comparison.

9. The method of claim 7, wherein the at least one actuatable portion is associated with a plurality of activity states, and the command to perform causes the actuatable portion to change from a first activity state to a second activity state.

10. The method of claim 9, wherein:
the change from the first activity state to the second activity state causes a corresponding change in at least one actuatable portion attribute associated with the at least one actuatable portion.

11. The method of claim 7, wherein the command comprises:
moving, by the at least one hardware processor, the position indicator to a predetermined area of the at least one actuatable portion; and
executing, by the at least one processor, at least one application associated with the at least one actuatable portion based on the movement of the position indicator to the predetermined area.

12. The method of claim 7, wherein:
the determined command causes a change in an appearance of the actuatable portion based on the plurality of vectors and the edge.

13. A non-transitory, computer-readable medium having computer-executable instructions stored thereon that, when executed by one or more hardware processors, cause a computing device to perform a plurality of operations comprising:
displaying, on a display in communication with the at least one hardware processor, a graphical user interface, the graphical user interface having at least one actuatable portion associated with an application executable by a computing device, wherein the at least one actuatable portion comprises an edge of the displayed graphical user interface;
acquiring, by at least one inertial measurement unit, a plurality of measurements indicating user movement of the computing device;
converting the plurality of measurements to obtain a plurality of vectors, wherein at least one vector of the plurality of vectors is associated with at least three axes of movement;
displaying a position indicator that moves in response to the plurality of vectors;
determine that the position indicator is at a predetermined distance from the edge of the at least one actuatable portion;
changing an appearance of the actuatable portion in response to the determination that the position indicator is at the predetermined distance from the edge of the at least one actuatable portion;
determining whether the position indicator has traversed the edge of the at least one actuatable portion;
determining a command to perform with the displayed graphical user interface in response to:
a determination that the position indicator has traversed the edge of the at least one actuatable portion within a predetermined timing of when the position indicator reached the predetermined distance; and
performing the determined command with the displayed graphical user interface.

14. The non-transitory, computer-readable medium of claim 13, wherein the plurality of operations further comprise:
comparing one or more values of the plurality of vectors with a plurality of corresponding thresholds, at least one of the thresholds selected from the plurality of thresholds associated with the command to perform; and
the determining of the command to perform is further based on the comparison.

15. The non-transitory, computer-readable medium of claim 13, wherein the at least one actuatable portion is associated with a plurality of activity states, and the command to perform causes the actuatable portion to change from a first activity state to a second activity state, wherein the change from the first activity state to the second activity state causes a corresponding change in at least one actuatable portion attribute associated with the at least one actuatable portion.

16. The non-transitory, computer-readable medium of claim 13, wherein the command comprises:
moving the position indicator to a predetermined area of the at least one actuatable portion; and
executing at least one application associated with the at least one actuatable portion based on the movement of the position indicator to the predetermined area.

17. The non-transitory, computer-readable medium of claim 16, wherein:
the at least one actuatable portion comprises a plurality of edges, at least one edge being associated with the execution of the at least one application; and
the predetermined area comprises the at least one edge.

18. The non-transitory, computer-readable medium of claim 13, wherein:
the determined command causes a change in an appearance of the actuatable portion based on the plurality of vectors and the at least one edge.

* * * * *